US010618329B2

(12) United States Patent
Sasaki

(10) Patent No.: US 10,618,329 B2
(45) Date of Patent: Apr. 14, 2020

(54) RIBBON WINDING MECHANISM AND TAPE PRINTING APPARATUS

(71) Applicant: SEIKO EPSON CORPORATION, Tokyo (JP)

(72) Inventor: Taishi Sasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 181 days.

(21) Appl. No.: 15/950,864

(22) Filed: Apr. 11, 2018

(65) Prior Publication Data

US 2018/0297384 A1    Oct. 18, 2018

(30) Foreign Application Priority Data

Apr. 13, 2017  (JP) ................................. 2017-079626
Dec. 27, 2017  (JP) ................................. 2017-250962

(51) Int. Cl.
| | | |
|---|---|---|
| *B41J 33/34* | (2006.01) | |
| *B41J 31/00* | (2006.01) | |
| *B41J 15/04* | (2006.01) | |
| *F16D 7/00* | (2006.01) | |
| *B41J 35/04* | (2006.01) | |

(Continued)

(52) U.S. Cl.
CPC .............. *B41J 33/34* (2013.01); *B41J 2/325* (2013.01); *B41J 15/042* (2013.01); *B41J 29/38* (2013.01); *B41J 31/00* (2013.01); *B41J 33/22* (2013.01); *B41J 35/04* (2013.01); *B41J 35/08* (2013.01); *F16D 7/00* (2013.01); *F16D 43/20* (2013.01)

(58) Field of Classification Search
CPC ........................................................ B41J 33/34

USPC ........................................................ 400/223
See application file for complete search history.

(56) References Cited

U.S. PATENT DOCUMENTS 4,694,305 A * 9/1987 Shiomi ..................... B41J 2/325
                                                          347/173
4,798,487 A * 1/1989 Hattori ................... B41J 33/388
                                                          400/185

(Continued)

FOREIGN PATENT DOCUMENTS

| JP | 10-058803 A | 3/1998 |
| JP | 2000-006504 A | 1/2000 |

(Continued)

OTHER PUBLICATIONS

Extended European Search Report dated Sep. 17, 2018 in related European Appl. 18167165.2 (6 pgs.).

*Primary Examiner* — Anthony H Nguyen
(74) *Attorney, Agent, or Firm* — Foley & Lardner LLP

(57) ABSTRACT

There is provided a ribbon winding mechanism including: a winding rotor; a first winding gear that is provided to be coaxial to the winding rotor and rotates the winding rotor; a second winding gear that is provided to be coaxial to the winding rotor and rotates the winding rotor via the first winding gear; a first torque limiter that limits torque, which is transmitted from the first winding gear to the winding rotor, to first torque; a second torque limiter that limits torque, which is transmitted from the second winding gear to the first winding gear, to second torque lower than the first torque; and a torque clutch that inputs power from a feed motor to the first winding gear when the first cartridge is mounted and inputs the power from the feed motor to the second winding gear when the second cartridge is mounted.

14 Claims, 21 Drawing Sheets

(51) Int. Cl.
*B41J 29/38* (2006.01)
*F16D 43/20* (2006.01)
*B41J 2/325* (2006.01)
*B41J 35/08* (2006.01)
*B41J 33/22* (2006.01)

(56) References Cited

U.S. PATENT DOCUMENTS

| | | | |
|---|---|---|---|
| 4,867,587 A * | 9/1989 | Kishida | B41J 33/56 400/216.2 |
| 5,370,469 A * | 12/1994 | Mutou | B41J 35/22 400/206 |
| 5,538,351 A * | 7/1996 | Miyano | B41J 32/00 347/171 |
| 5,820,280 A | 10/1998 | Fox | |
| 5,836,704 A | 11/1998 | Lau et al. | |
| 5,921,688 A * | 7/1999 | Furuya | B41J 17/32 101/288 |
| 5,927,875 A | 7/1999 | Lau et al. | |
| 6,042,038 A | 3/2000 | Shiraishi | |
| 6,129,463 A | 10/2000 | Lau et al. | |
| 6,145,769 A | 11/2000 | Shiraishi et al. | |
| 6,290,408 B1 | 9/2001 | Yorozu | |
| 7,097,372 B1 | 8/2006 | Heyse et al. | |
| 2002/0141804 A1 | 10/2002 | Ono et al. | |
| 2002/0180859 A1 | 12/2002 | Yoshida | |
| 2003/0103133 A1 | 6/2003 | Ueda et al. | |
| 2004/0071487 A1 | 4/2004 | Ono et al. | |
| 2004/0114024 A1 | 6/2004 | Bouverie et al. | |
| 2006/0007296 A1 | 1/2006 | Bouverie et al. | |
| 2006/0216097 A1 | 9/2006 | Ono | |
| 2006/0233583 A1 | 10/2006 | Ono | |
| 2014/0212196 A1 | 7/2014 | Deonarine | |
| 2015/0097912 A1 | 4/2015 | Deonarine | |
| 2017/0051794 A1 | 2/2017 | Lin | |

FOREIGN PATENT DOCUMENTS

| | | |
|---|---|---|
| JP | 2000-141840 A | 5/2000 |
| JP | 2002-200807 A | 7/2002 |
| JP | 2002-200808 A | 7/2002 |
| JP | 2002-200831 A | 7/2002 |
| JP | 2002-234241 A | 8/2002 |
| JP | 2002-254784 A | 9/2002 |
| JP | 2002-321419 A | 11/2002 |
| JP | 2002-347263 A | 12/2002 |
| JP | 2003-136820 A | 5/2003 |
| JP | 2006-272559 A | 10/2006 |
| JP | 2006-289844 A | 10/2006 |
| JP | 2006-334857 A | 12/2006 |
| JP | 2008-137224 A | 6/2008 |
| WO | WO 2004/060684 A1 | 7/2004 |

* cited by examiner

FIG. 11
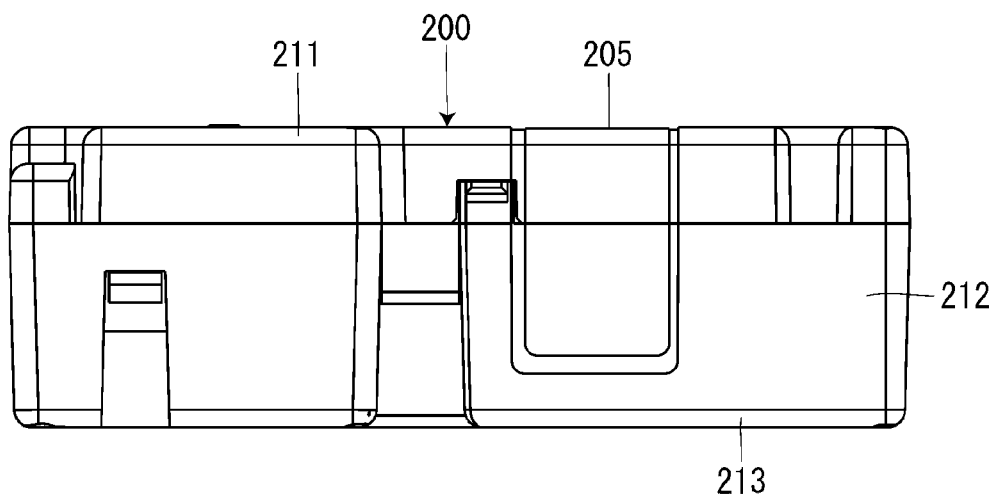
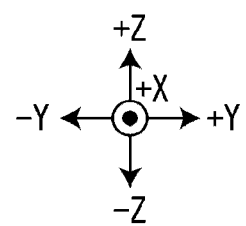

RIBBON WINDING MECHANISM AND TAPE PRINTING APPARATUS

BACKGROUND

1. Technical Field

The present invention relates to a ribbon winding mechanism for winding an ink ribbon and a tape printing apparatus.

2. Related Art

In the related art, as disclosed in JP-A-2006-334857, there is known a ribbon winding mechanism that selectively operates a slip mechanism that is loosely mounted in a gear case by attaching and detaching a switching member to and from the gear case, thereby being capable of switching winding torque.

Since the ribbon winding mechanism of the related art is configured to switch the winding torque by attaching and detaching the switching member to and from the gear case, a user needs to perform an operation of attaching and detaching the switching member to and from the gear case in order to switch the winding torque.

SUMMARY

An advantage of some aspects of the invention is to provide a ribbon winding mechanism and a tape printing apparatus which are capable of switching winding torque with a simple operation.

According to an aspect of the invention, there is provided a ribbon winding mechanism including: a winding rotor that is provided in a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted, and that engages with the first ribbon winding core and the second ribbon winding core; a first winding gear that is provided to be coaxial to the winding rotor and rotates the winding rotor; a second winding gear that is provided to be coaxial to the winding rotor and rotates the winding rotor via the first winding gear; a first torque limiter that limits torque transmitted from the first winding gear to the winding rotor to first torque; a second torque limiter that limits torque transmitted from the second winding gear to the first winding gear to second torque lower than the first torque; and a clutch that inputs power from a drive source to the first winding gear when the first cartridge is mounted and inputs the power from the drive source to the second winding gear when the second cartridge is mounted.

In this configuration, when the first cartridge is mounted, the power from the drive source is input to the first winding gear, and thus the torque that is transmitted to the winding rotor is limited to the first torque by the first torque limiter. On the other hand, when the second cartridge is mounted, the power from the drive source is input to the second winding gear, and thus the torque that is transmitted to the winding rotor via the first winding gear is limited to the second torque by the second torque limiter. Therefore, mounting of the first cartridge in the cartridge mounting unit by a user causes winding torque of the winding rotor to be switched to the first torque, and mounting of the second cartridge in the cartridge mounting unit causes winding torque of the winding rotor to be switched to the second torque. Hence, it is possible to switch the winding torque with a simple operation.

In the ribbon winding mechanism, it is preferable that the clutch include a sun gear to which the power from the drive source is input, a first planetary gear that intermeshes with the sun gear and adjoins the first winding gear, a second planetary gear that intermeshes with the sun gear and adjoins the second winding gear, and a carrier that supports the first planetary gear and the second planetary gear in a rotatable manner and is provided to be rotatable between a first carrier position, at which the power is transmitted from the first planetary gear to the first winding gear but the power is not transmitted from the second planetary gear to the second winding gear when the sun gear rotates, and a second carrier position, at which the power is not transmitted from the first planetary gear to the first winding gear but the power is transmitted from the second planetary gear to the second winding gear when the sun gear rotates. It is preferable that the carrier be positioned at the first carrier position when the first cartridge is mounted, and the carrier be positioned at the second carrier position when the second cartridge is mounted.

In this configuration, when the first cartridge is mounted, the carrier is positioned at the first carrier position, and thereby the power from the drive source is input to the first winding gear. On the other hand, when the second cartridge is mounted, the carrier is positioned at the second carrier position, and thereby the power from the drive source is input to the second winding gear.

In the ribbon winding mechanism, it is preferable that the clutch further include an engagement member that is provided to be movable to an engaging position, at which the engagement member engages with the carrier such that the carrier is positioned at the first carrier position, and to a disengaging position, at which the engagement member does not engage with the carrier such that the carrier is positioned at the second carrier position when the sun gear rotates. It is preferable that the engagement member be positioned at the engaging position when the first cartridge is mounted, and the engagement member be positioned at the disengaging position when the second cartridge is mounted.

In this configuration, when the first cartridge is mounted, the engagement member is positioned at the engaging position at which the engagement member engages with the carrier, and thereby the carrier is positioned at the first carrier position. On the other hand, when the second cartridge is mounted, the engagement member is positioned at the disengaging position at which the engagement member does not engage with the carrier, and thereby the carrier is positioned at the second carrier position when the sun gear rotates.

In the ribbon winding mechanism, it is preferable that the engagement member retractably project from a wall portion of the cartridge mounting unit. It is preferable that the engagement member be pushed by the first cartridge to be positioned at the engaging position when the first cartridge is mounted, and the engagement member be positioned at the disengaging position when the second cartridge is mounted, with a smaller movement length compared to a case where the first cartridge is mounted.

In this configuration, when the first cartridge is mounted, the engagement member is pushed by the first cartridge and moves, and thereby the engagement member is positioned at the engaging position. On the other hand, when the second cartridge is mounted, the movement length of the engagement member is small, and thereby the engagement member is positioned at the disengaging position.

In the ribbon winding mechanism, it is preferable that the first cartridge be mounted in the cartridge mounting unit such that a gap from the wall portion is a first gap, and the second cartridge be mounted in the cartridge mounting unit such that a gap from the wall portion is a second gap larger than the first gap. It is preferable that the engagement member have a non-mounting-period projecting length that is larger than the first gap, the mounting-period projecting length being a projecting length from the wall portion, which is obtained when neither the first cartridge nor the second cartridge are mounted in the cartridge mounting unit.

In the configuration, when the first cartridge is mounted, the engagement member is pushed by the first cartridge and moves until the projecting length of the engagement member from the wall portion is equal to the first gap. On the other hand, when the second cartridge is mounted, the engagement member is pushed by the second cartridge and moves until the projecting length from the wall portion is equal to the second gap if the non-mounting-period projecting length of the engagement member is larger than the second gap. The engagement member is not pushed by the second cartridge and does not move if the non-mounting-period projecting length of the engagement member is smaller than the second gap. In this manner, when the second cartridge is mounted, the movement length of the engagement member is small, compared to a case where the first cartridge is mounted.

In the ribbon winding mechanism, it is preferable that the clutch further include an engagement member that is provided to be movable to an engaging position, at which the engagement member engages with the carrier such that the carrier is positioned at the second carrier position, and to a disengaging position, at which the engagement member does not engage with the carrier such that the carrier is positioned at the first carrier position when the sun gear rotates. It is preferable the engagement member be positioned at the disengaging position when the first cartridge is mounted, and the engagement member be positioned at the engaging position when the second cartridge is mounted.

In this configuration, when the first cartridge is mounted, the engagement member is positioned at the disengaging position at which the engagement member does not engage with the carrier, and thereby the carrier is positioned at the first carrier position. On the other hand, when the second cartridge is mounted, the engagement member is positioned at the engaging position at which the engagement member engages with the carrier, and thereby the carrier is positioned at the second carrier position when the sun gear rotates.

According to another aspect of the invention, there is provided a ribbon winding mechanism including: a winding rotor that is provided in a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted, and that engages with the first ribbon winding core and the second ribbon winding core; a first winding gear that is provided to be coaxial to the winding rotor and rotates the winding rotor; a second winding gear that is provided to be coaxial to the winding rotor and rotates the winding rotor via the first winding gear; a first torque limiter that limits torque transmitted from the first winding gear to the winding rotor to first torque; a second torque limiter that limits torque transmitted from the second winding gear to the first winding gear to second torque lower than the first torque; and a clutch that inputs power from a drive source to the first winding gear and the second winding gear when the first cartridge is mounted and inputs the power from the drive source to the second winding gear without inputting the power to the first winding gear when the second cartridge is mounted.

In this configuration, when the first cartridge is mounted, the power from the drive source is input to the first winding gear and the second winding gear, and thus the torque that is transmitted to the winding rotor is limited to the first torque by the first torque limiter. On the other hand, when the second cartridge is mounted, the power from the drive source is input to the second winding gear, and thus the torque that is transmitted to the winding rotor via the first winding gear is limited to the second torque by the second torque limiter. Therefore, mounting of the first cartridge in the cartridge mounting unit by a user causes winding torque of the winding rotor to be switched to the first torque, and mounting of the second cartridge in the cartridge mounting unit causes winding torque of the winding rotor to be switched to the second torque. Hence, it is possible to switch the winding torque with a simple operation.

In the ribbon winding mechanism, it is preferable that the clutch include an input gear that inputs the power from the drive source to the second winding gear, a sun gear to which the power from the drive source is input, a planetary gear that intermeshes with the sun gear and adjoins the first winding gear, and a carrier that supports the planetary gear in a rotatable manner and is provided to be rotatable between a first carrier position, at which the power is transmitted from the planetary gear to the first winding gear when the sun gear rotates, and a second carrier position, at which the power is not transmitted from the planetary gear to the first winding gear when the sun gear rotates. It is preferable that the carrier be positioned at the first carrier position when the first cartridge is mounted, and the carrier be positioned at the second carrier position when the second cartridge is mounted.

In this configuration, when the first cartridge is mounted, the carrier is positioned at the first carrier position, and thereby the power from the drive source is input to the first winding gear and the second winding gear. On the other hand, when the second cartridge is mounted, the carrier is positioned at the second carrier position, and thereby the power from the drive source is input to the second winding gear.

In the ribbon winding mechanism, it is preferable that the clutch further include an elastic member that applies a force to the carrier toward the second carrier position, and an engagement member that is provided to be movable to a first engaging position, at which the engagement member engages with the carrier in a first engagement portion and the carrier is positioned at the first carrier position against the elastic member, and to a second engaging position, at which the engagement member engages with the carrier in a second engagement portion and the carrier is positioned at the second carrier position by the elastic member. It is preferable that the engagement member be positioned at the first engaging position when the first cartridge is mounted, and the engagement member be positioned at the second engaging position when the second cartridge is mounted.

In this configuration, when the first cartridge is mounted, the engagement member is positioned at the first engaging position at which the engagement member engages with the carrier in the first engagement portion, and thereby the carrier is positioned at the first carrier position. On the other hand, when the second cartridge is mounted, the engagement member is positioned at the second engaging position at which the engagement member engages with the carrier in the second engagement portion, and thereby the carrier is positioned at the second carrier position.

In the ribbon winding mechanism, it is preferable that the clutch further include an elastic member that applies a force to the carrier toward the first carrier position, and an engagement member that is provided to be movable to a first engaging position, at which the engagement member engages with the carrier in a first engagement portion and the carrier is positioned at the second carrier position against the elastic member, and to a second engaging position, at which the engagement member engages with the carrier in a second engagement portion and the carrier is positioned at the first carrier position by the elastic member. It is preferable that the engagement member be positioned at the second engaging position when the first cartridge is mounted, and the engagement member be positioned at the first engaging position when the second cartridge is mounted.

In this configuration, when the first cartridge is mounted, the engagement member is positioned at the second engaging position at which the engagement member engages with the carrier in the second engagement portion, and thereby the carrier is positioned at the first carrier position. On the other hand, when the second cartridge is mounted, the engagement member is positioned at the first engaging position at which the engagement member engages with the carrier in the first engagement portion, and thereby the carrier is positioned at the second carrier position.

In the ribbon winding mechanism, it is preferable that the first winding gear be provided between the winding rotor and the second winding gear.

In this configuration, it is possible to transmit the torque from the second winding gear to the winding rotor via the first winding gear in a simple configuration.

In the ribbon winding mechanism, it is preferable that the second ink ribbon have a width narrower than the first ink ribbon.

In this configuration, when the first cartridge that accommodates the first ink ribbon having a relatively wide width is mounted, the winding torque is switched to the first torque that is relatively high. When the second cartridge that accommodates the second ink ribbon having a relatively narrow width is mounted, the winding torque is switched to the second torque that is relatively low. In this manner, it is possible to suppress breaking of the ink ribbon, and it is possible to appropriately wind the ink ribbon.

According to still another aspect of the invention, there is provided a tape printing apparatus including: a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted; a ribbon winding mechanism that rotates the first ribbon winding core and the second ribbon winding core; a drive source that drives the ribbon winding mechanism; and a thermal head that performs printing by using the first ink ribbon when the first cartridge is mounted and that performs printing by using the second ink ribbon when the second cartridge is mounted. The ribbon winding mechanism includes a winding rotor that is provided in the cartridge mounting unit and engages with the first ribbon winding core and the second ribbon winding core, a first winding gear that is provided to be coaxial to the winding rotor and rotates the winding rotor, a second winding gear that is provided to be coaxial to the winding rotor and rotates the winding rotor via the first winding gear, a first torque limiter that limits torque transmitted from the first winding gear to the winding rotor to first torque, a second torque limiter that limits torque transmitted from the second winding gear to the first winding gear to second torque lower than the first torque, and a clutch that inputs power from the drive source to the first winding gear when the first cartridge is mounted and inputs the power from the drive source to the second winding gear when the second cartridge is mounted.

In this configuration, when the first cartridge is mounted, the power from the drive source is input to the first winding gear, and thus the torque that is transmitted to the winding rotor is limited to the first torque by the first torque limiter. On the other hand, when the second cartridge is mounted, the power from the drive source is input to the second winding gear, and thus the torque that is transmitted to the winding rotor via the first winding gear is limited to the second torque by the second torque limiter. Therefore, mounting of the first cartridge by a user causes winding torque to be switched to the first torque, and mounting of the second cartridge causes winding torque to be switched to the second torque. Hence, it is possible to switch the winding torque with a simple operation. In this manner, even when one of the first cartridge and the second cartridge is mounted, it is possible to perform printing while the first ink ribbon and the second ink ribbon are wound with the winding torque suitable for the mounted cartridge.

According to still another aspect of the invention, there is provided a tape printing apparatus including: a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted; a ribbon winding mechanism that rotates the first ribbon winding core and the second ribbon winding core; a drive source that drives the ribbon winding mechanism; and a thermal head that performs printing by using the first ink ribbon when the first cartridge is mounted and that performs printing by using the second ink ribbon when the second cartridge is mounted. The ribbon winding mechanism includes a winding rotor that is provided in the cartridge mounting unit and engages with the first ribbon winding core and the second ribbon winding core, a first winding gear that is provided to be coaxial to the winding rotor and rotates the winding rotor, a second winding gear that is provided to be coaxial to the winding rotor and rotates the winding rotor via the first winding gear, a first torque limiter that limits torque transmitted from the first winding gear to the winding rotor to first torque, a second torque limiter that limits torque transmitted from the second winding gear to the first winding gear to second torque lower than the first torque, and a clutch that inputs power from the drive source to the first winding gear and the second winding gear when the first cartridge is mounted and inputs the power from the drive source to the second winding gear without inputting the power to the first winding gear when the second cartridge is mounted.

In this configuration, when the first cartridge is mounted, the power from the drive source is input to the first winding gear and the second winding gear, and thus the torque that is transmitted to the winding rotor is limited to the first torque by the first torque limiter. On the other hand, when the second cartridge is mounted, the power from the drive source is input to the second winding gear, and thus the torque that is transmitted to the winding rotor via the first winding gear is limited to the second torque by the second torque limiter. Therefore, mounting of the first cartridge in the cartridge mounting unit by a user causes winding torque of the winding rotor to be switched to the first torque, and mounting of the second cartridge in the cartridge mounting unit causes winding torque of the winding rotor to be switched to the second torque. Hence, it is possible to switch the winding torque with a simple operation. In this manner, even when one of the first cartridge and the second cartridge is mounted, it is possible to perform printing while the first ink ribbon and the second ink ribbon are wound with the winding torque suitable for the mounted cartridge.

BRIEF DESCRIPTION OF THE DRAWINGS

The invention will be described with reference to the accompanying drawings, wherein like numbers reference like elements.

FIG. 11 is a view of the second cartridge viewed from the +X side.

DESCRIPTION OF EXEMPLARY EMBODIMENTS

Hereinafter, a ribbon winding mechanism and a tape printing apparatus A which is an embodiment of a tape printing apparatus of the invention will be described with reference to the accompanying drawings. In the following drawings, it is needless to say that, in order to clearly show an arrangement relationship between portions, an XYZ orthogonal coordinate system is illustrated; however, the invention is not limited thereto.

Figure 1:
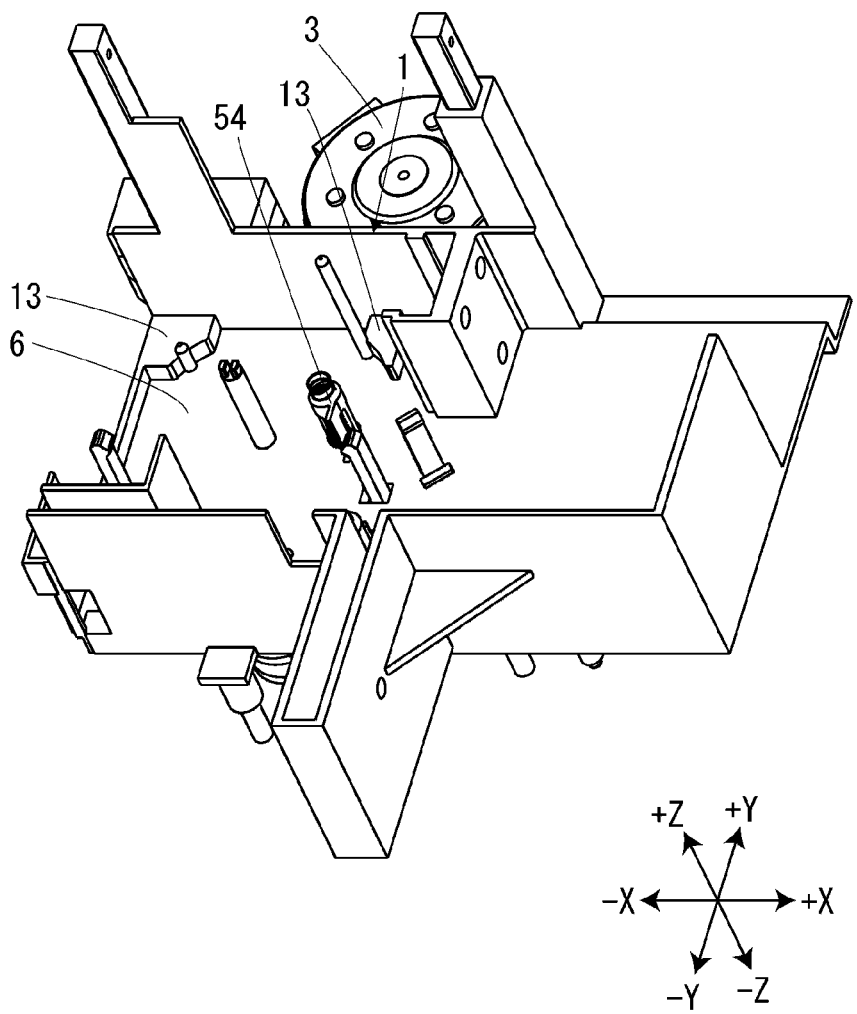
FIG. 1 is a perspective view of a part around a cartridge mounting unit of a tape printing apparatus according to an embodiment of the invention.
Figure 2:
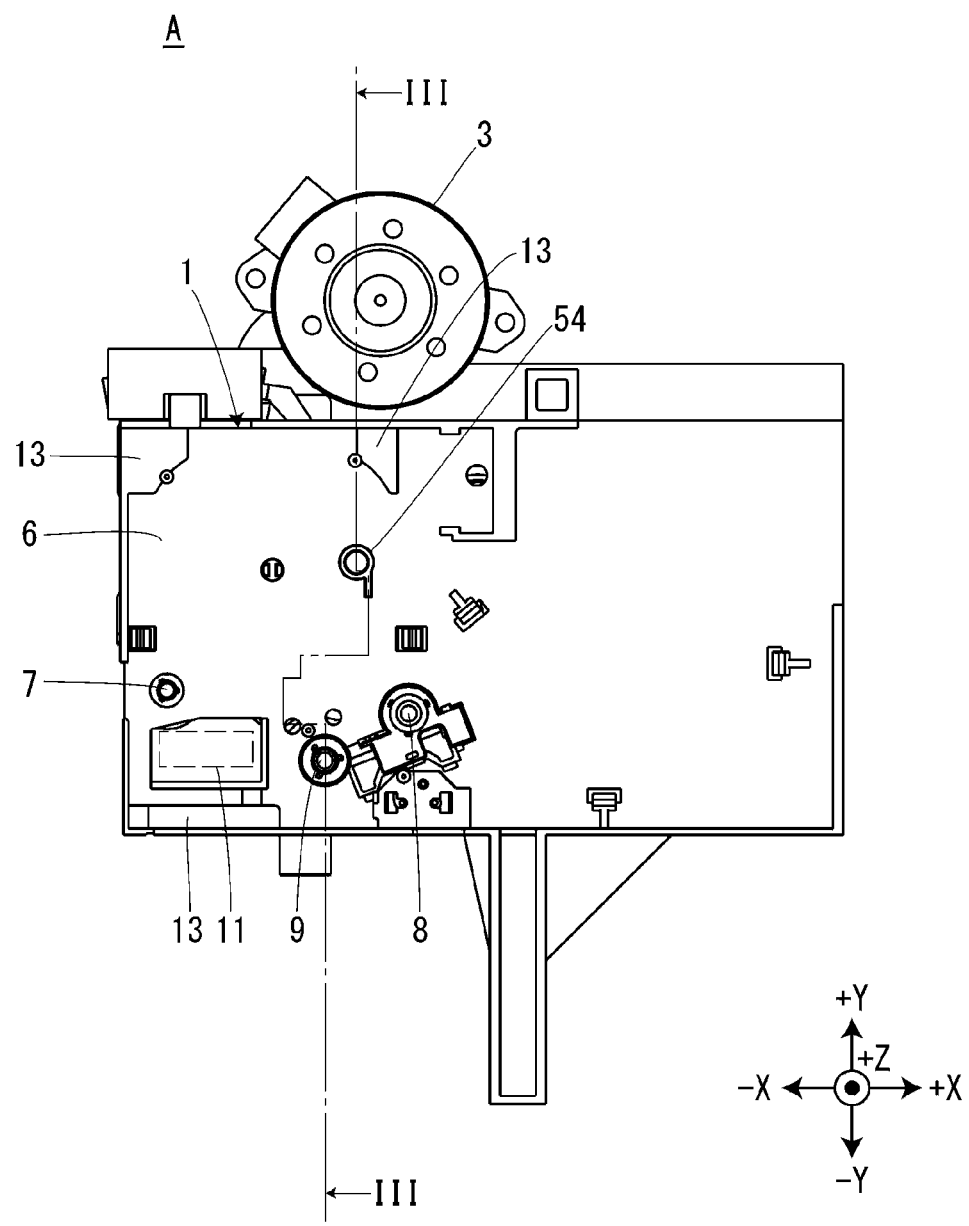
FIG. 2 is a view of a part around the cartridge mounting unit viewed from a +Z side.
Figure 3:
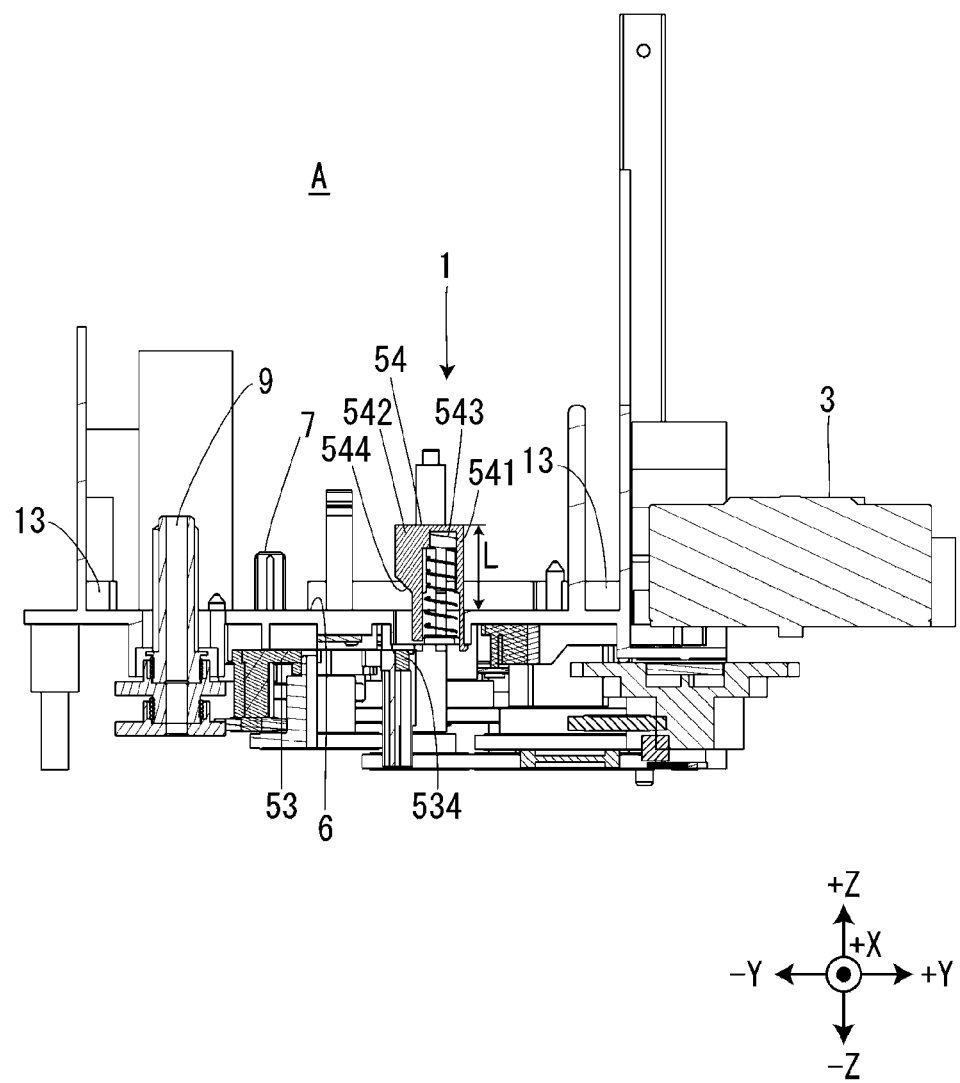
FIG. 3 is a sectional view taken along cutting line in FIG. 2.

A schematic configuration of the tape printing apparatus A is described with reference to FIGS. 1 to 3. The tape printing apparatus A performs printing by using one cartridge that accommodates both of a tape T and an ink ribbon R, like a first cartridge 100 (refer to FIG. 5) and a second cartridge 200 (refer to FIG. 8) which will be described below.

The tape printing apparatus A includes a cartridge mounting unit 1 and a feed motor 3. The tape printing apparatus A includes a feed wheel train 20 and a ribbon winding mechanism 28 (refer to FIG. 12), which are not illustrated in FIGS. 1 to 3.

The first cartridge 100 (refer to FIGS. 4 to 6) or the second cartridge 200 (refer to FIGS. 7 to 9) is mounted in the cartridge mounting unit 1.

The cartridge mounting unit 1 includes a mounting bottom wall 6 on a back side (−Z side) in a mounting direction of the first cartridge 100 or the second cartridge 200. On the mounting bottom wall 6, a platen shaft 7, an unwinding shaft 8, a winding shaft 9, and a thermal head 11 are provided to project on a +Z side. In addition, the mounting bottom wall 6 is provided with projecting mounting portions 13 projecting to the +Z side are provided on three positions of a corner on a +X side and a +Y side, a corner on a −X side and the +Y side, and a corner on the −X side and a −Y side. Further, the mounting bottom wall 6 is provided with an engagement member 54 to be described below, which retractably projects on the +Z side.

The first cartridge 100 is described with reference to FIGS. 4 to 6. The first cartridge 100 includes a tape core 101, a platen roller 102, a ribbon unwinding core 103, a first ribbon winding core 104, and a first cartridge case 105 that accommodates the cores and the roller. A first tape Ta having a first tape width (for example, 36 mm) is wound into a roll shape around the tape core 101. A first ink ribbon Ra having a first ribbon width is wound into a roll shape around the ribbon unwinding core 103.

Figure 7:
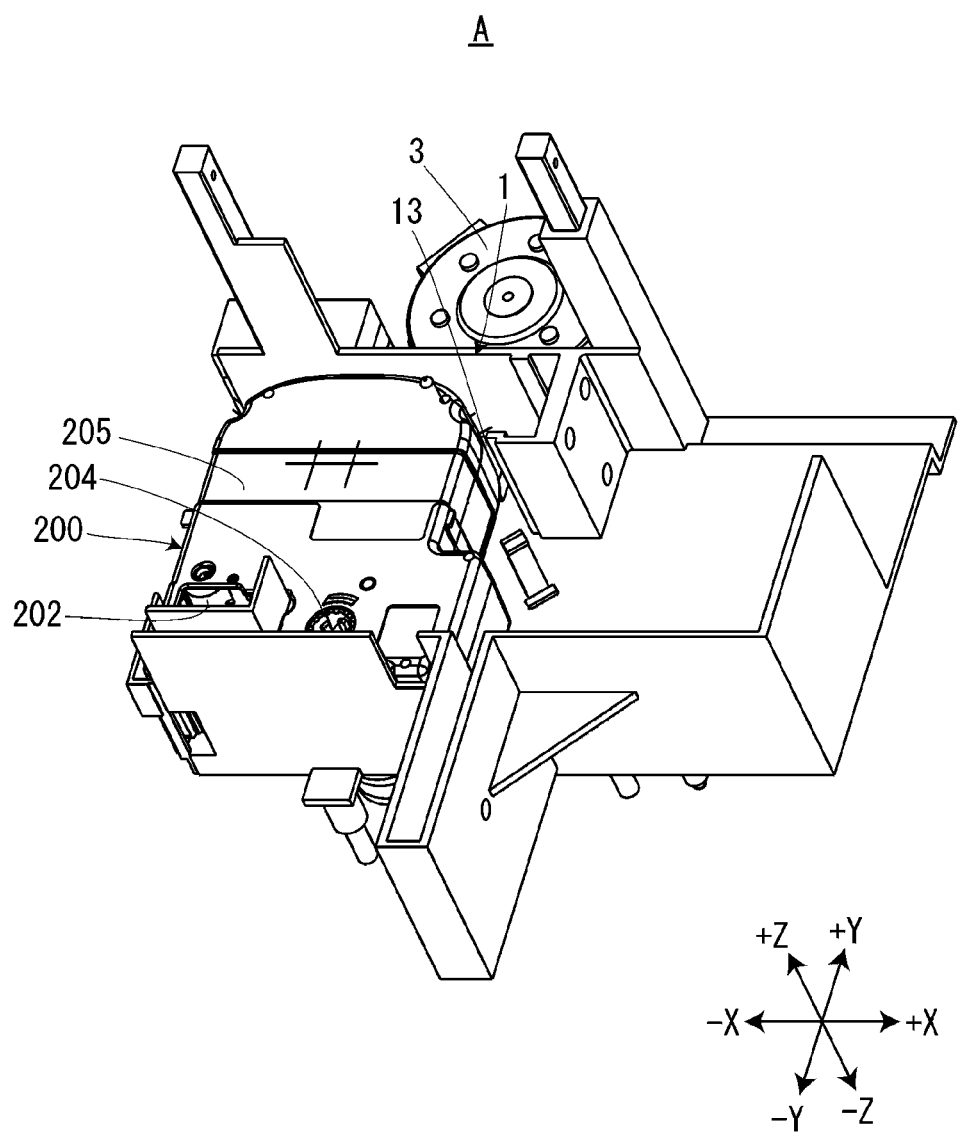
FIG. 7 is a perspective view of a part around the cartridge mounting unit in a state in which a second cartridge is mounted in the cartridge mounting unit.
Figure 8:
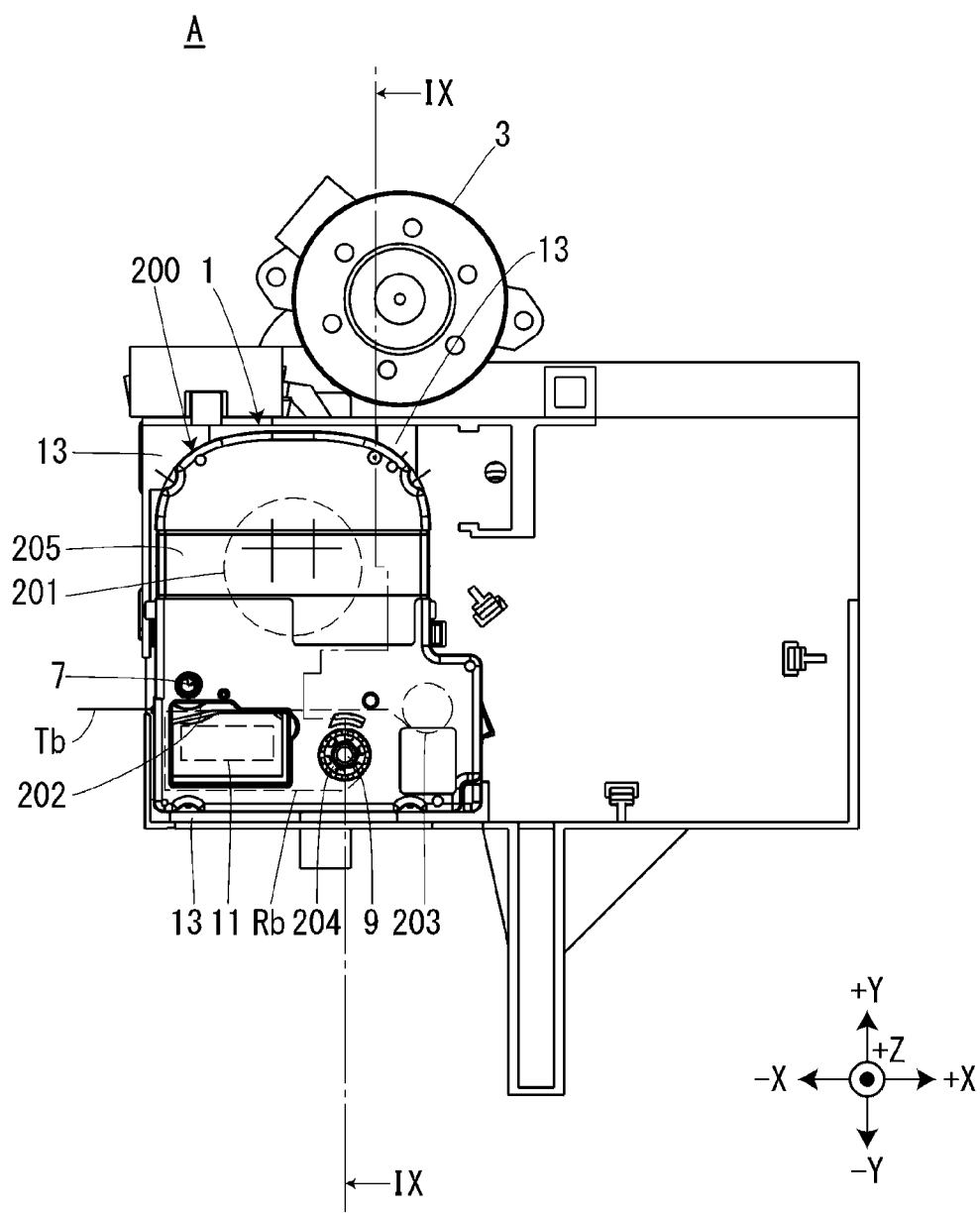
FIG. 8 is a view of a part around the cartridge mounting unit viewed from the +Z side in the state in which the second cartridge is mounted in the cartridge mounting unit.
Figure 9:
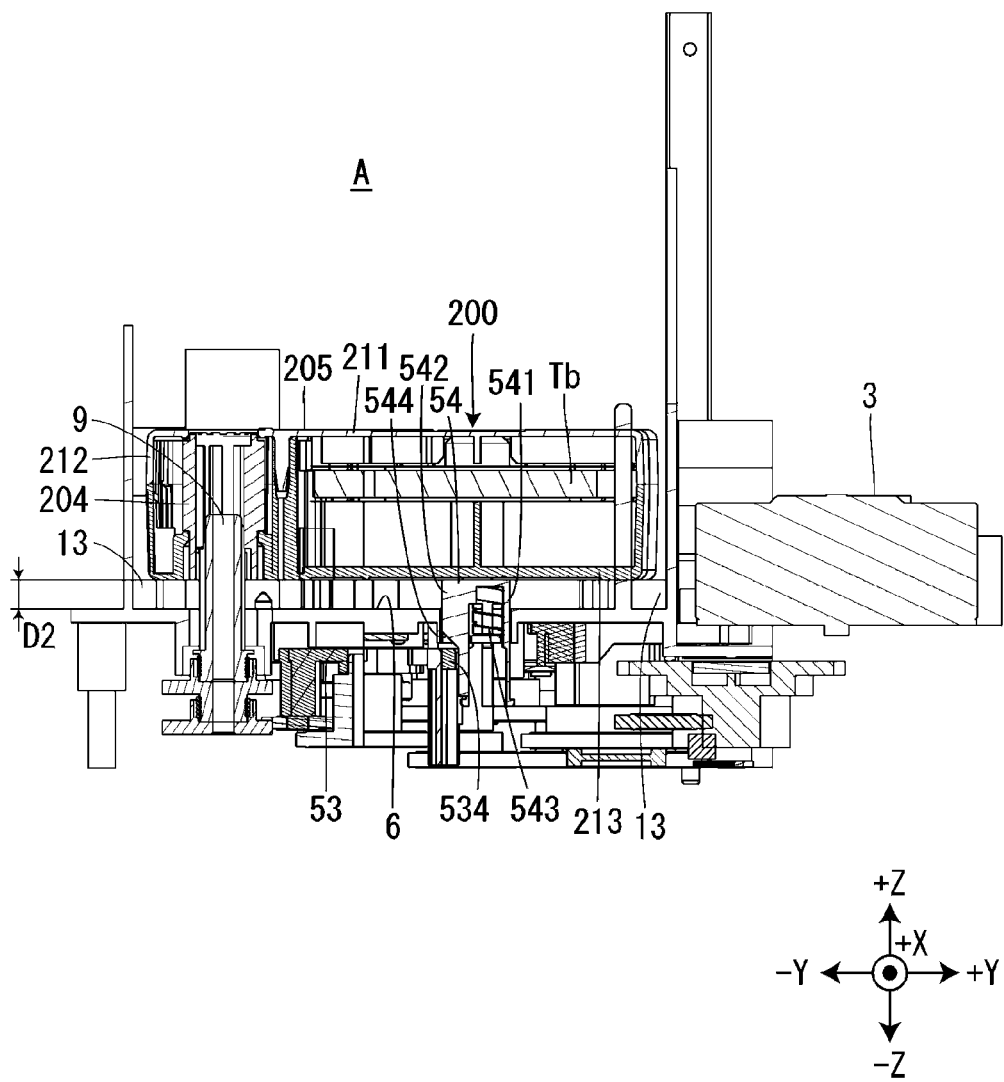
FIG. 9 is a sectional view taken along cutting line IX-IX in FIG. 8.

The second cartridge 200 is described with reference to FIGS. 7 to 9. Similar to the first cartridge 100, the second cartridge 200 includes a tape core 201, a platen roller 202, a ribbon unwinding core 203, a second ribbon winding core 204, and a second cartridge case 205 that accommodates the cores and the roller. A second tape Tb having a second tape width (for example, 24 mm) narrower than the first tape width is wound into a roll shape around the tape core 201. A second ink ribbon Rb having a second ribbon width narrower than the first ribbon width is wound into a roll shape around the ribbon unwinding core 203. In a case where there is no need to particularly distinguish between the first tape Ta and the second tape Tb, the tap is simply referred to as a "tape T". Similarly, in a case where there is no need to particularly distinguish between the first ink ribbon Ra and the second ink ribbon Rb, the ribbon is simply referred to as an "ink ribbon R". In addition, a difference between the first cartridge case 105 and the second cartridge case 205 will be described below.

Figure 4:
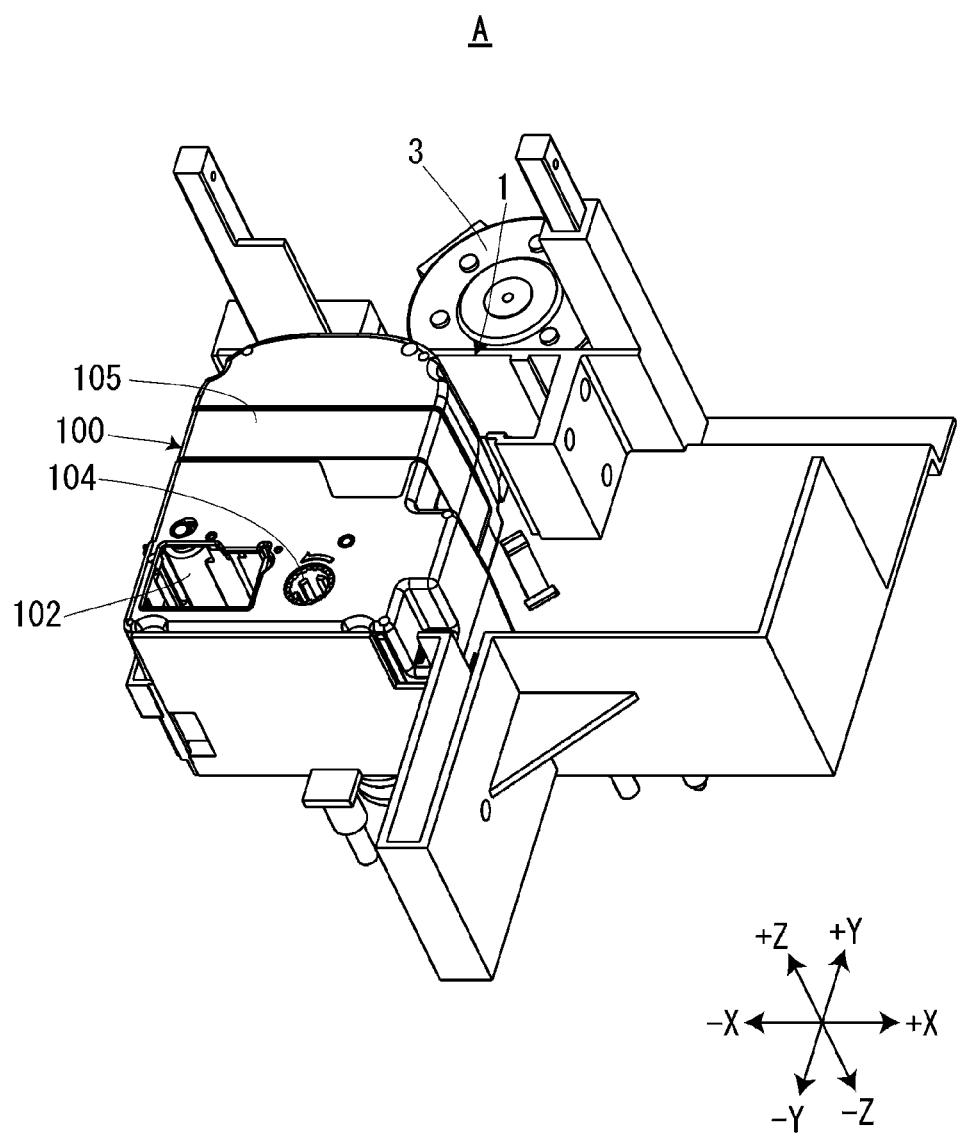
FIG. 4 is a perspective view of a part around the cartridge mounting unit in a state in which a first cartridge is mounted in the cartridge mounting unit.
Figure 5:
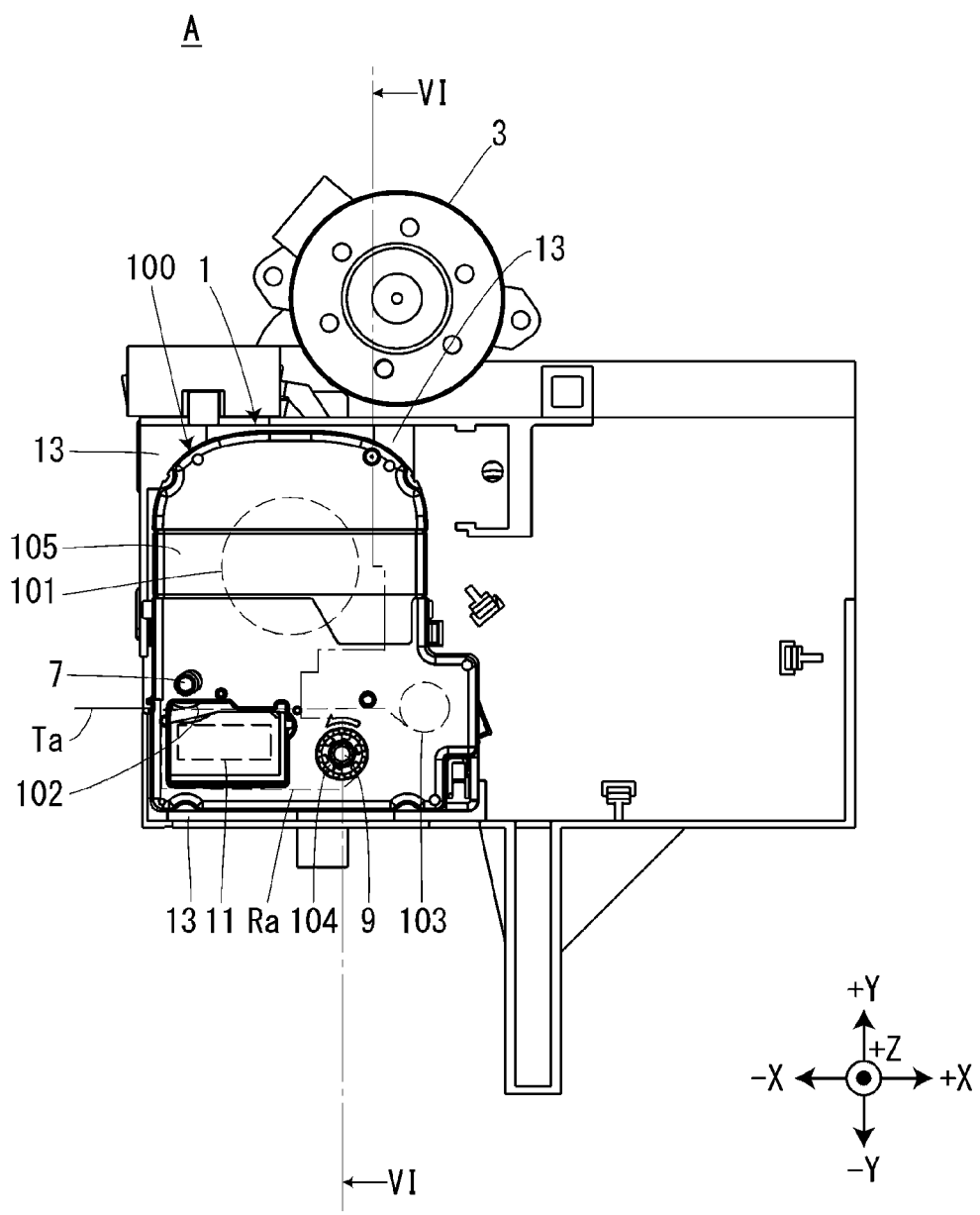
FIG. 5 is a view of a part around the cartridge mounting unit viewed from the +Z side in the state in which the first cartridge is mounted in the cartridge mounting unit.
Figure 6:
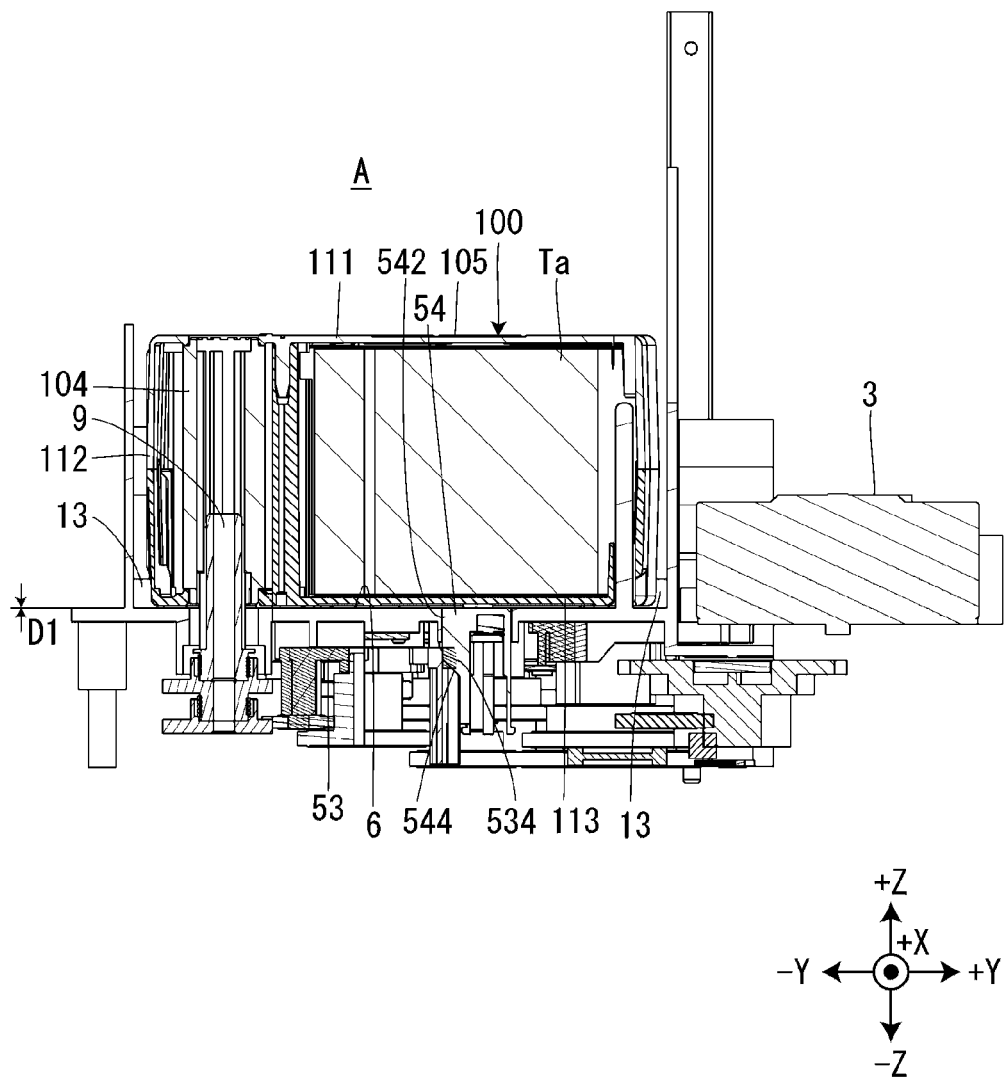
FIG. 6 is a sectional view taken along cutting line VI-VI in FIG. 5.

The description back to FIGS. 4 to 6 is provided. When the first cartridge 100 is mounted in the cartridge mounting unit 1, the platen shaft 7, the unwinding shaft 8, and the winding shaft 9 are inserted into the platen roller 102, the ribbon unwinding core 103, and the first ribbon winding core 104, respectively. In this manner, the tape T and the ink ribbon R is pinched between the thermal head 11 and the platen roller 102. In this state, when the feed motor 3 rotates in a forward direction, the platen roller 102 rotates in the forward direction and the first ribbon winding core 104 rotates in a winding direction. In this manner, forward feeding of the tape T and the ink ribbon R is performed. In other words, the tape T is unwound from the tape core 101 so as to be fed toward a tape discharge opening (not illustrated) outside the first cartridge case 105 and the ink ribbon R is unwound from the ribbon unwinding core 103 so as to be wound around the first ribbon winding core 104. On the other hand, when the feed motor 3 rotates in a reverse direction, the platen roller 102 rotates in the reverse direction and the ribbon unwinding core 103 rotates in a rewinding direction. In this manner, reverse feeding of the tape T and the ink ribbon R is performed. In other words, the tape T discharged from the tape discharge opening is pulled back and the ink ribbon R is rewound around the ribbon unwinding core 103. Here, a case where the first cartridge 100 is mounted in the cartridge mounting unit 1 is described as an example. The same is true of a case where the second cartridge 200 is mounted, and the forward feeding and the reverse feeding of the tape T and the ink ribbon R are performed.

In the tape printing apparatus A having such a configuration, when a user inputs a desired character from an operation panel (not illustrated), and execution of printing is instructed, the forward feeding of the tape T and the ink ribbon R is performed and the thermal head 11 heats up. In this manner, the input character is printed on the tape T. After the printing is ended, a cutter (not illustrated) performs a cutting operation, and a printed portion of the tape T is cut off and is discharged from the tape discharge opening. Then, the reverse feeding of the tape T and the ink ribbon R is performed. In this manner, until the leading end of the tape T approaches the vicinity of a position of printing by the thermal head 11, the tape T is pulled back. Therefore, it is possible to reduce a margin generated in front in a length direction of the tape T due to a separation distance between the thermal head 11 and the cutter, on the tape T on which the next printing is performed.

The first cartridge case 105 and the second cartridge case 205 are described with reference to FIGS. 6, 9, 10, and 11.

The first cartridge case 105 includes a first wall 111, a second wall 112, and a third wall 113. The first wall 111 and the third wall 113 are opposite to each other. The second wall 112 configures a peripheral wall of the first cartridge case 105. The first cartridge 100 is mounted in the cartridge mounting unit 1, in a state in which the first wall 111 is oriented to the +Z side and the third wall 113 is oriented to the −Z side. Similar to the first cartridge case 105, the second cartridge case 205 includes a first wall 211, a second wall 212, and a third wall 213.

Figure 10:
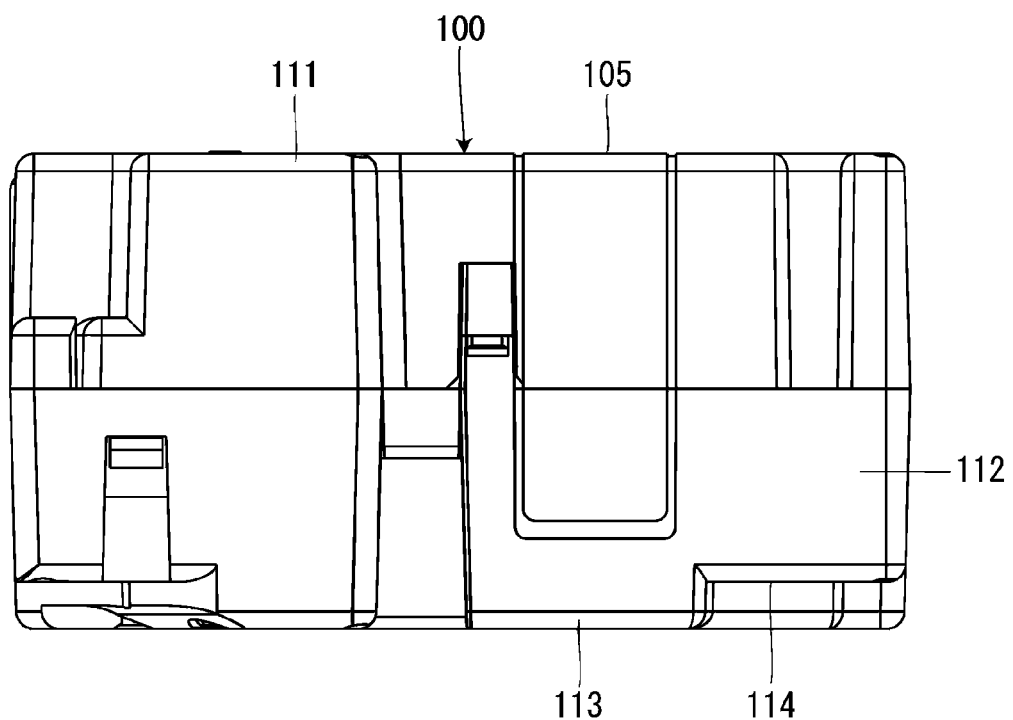
FIG. 10 is a view of the first cartridge viewed from a +X side.

In addition, the third wall 113 of the first cartridge case 105 is provided with recessed case portions 114 recessed on the +Z side at three positions of a corner on the +X side and the +Y side, a corner on the −X side and the +Y side, and a corner on the −X side and the −Y side, which correspond to the projecting mounting portions 13 provided at three positions of the mounting bottom wall 6 (only one position is illustrated in FIG. 10). Therefore, when the first cartridge 100 is mounted in the cartridge mounting unit 1, avoiding of the projecting mounting portions 13 is performed by the recessed case portion 114, and the third wall 113 substantially comes into contact with the mounting bottom wall 6 (refer to FIG. 6). In other words, the first cartridge 100 is mounted in the cartridge mounting unit 1 such that a gap between the third wall 113 and the mounting bottom wall 6 is a first gap D1. Here, the first gap D1 is substantially zero.

On the other hand, the third wall 213 of the second cartridge case 205 is not provided with a recessed portion like the recessed case portion 114 (refer to FIG. 11). Therefore, when the second cartridge 200 is mounted in the cartridge mounting unit 1, the second cartridge is mounted in a state in which the corners of the third wall 213 are laid on the projecting mounting portions 13, and the third wall 213 floats from the mounting bottom wall 6 (refer to FIG. 9). In other words, the second cartridge 200 is mounted in the cartridge mounting unit 1 such that a gap between the third wall 213 and the mounting bottom wall 6 is a second gap D2 larger than the first gap D1. Here, the second gap D2 is substantially equal to a projecting height of the projecting mounting portions 13 from the mounting bottom wall 6 in the Z direction.

Figure 12:
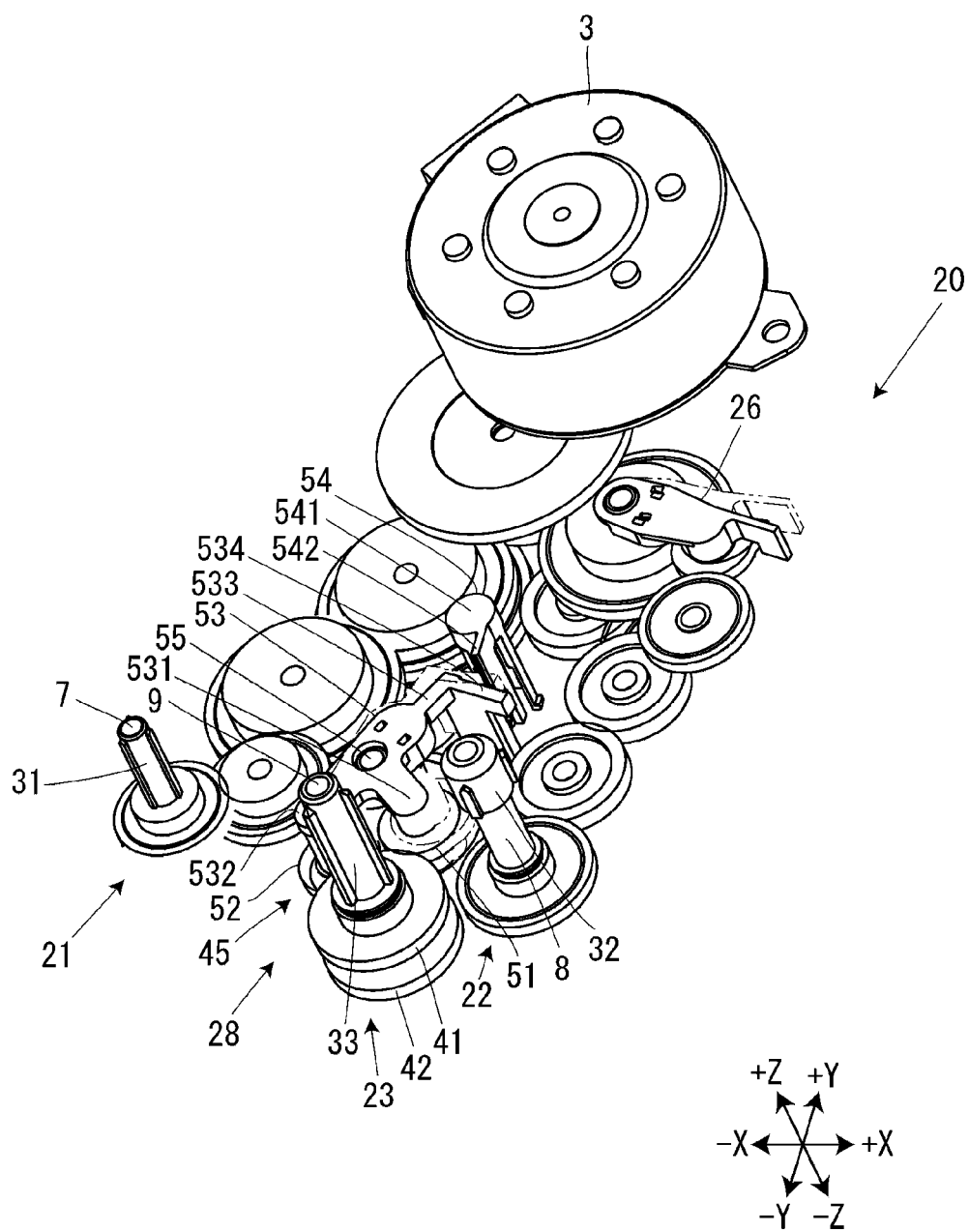
FIG. 12 is a perspective view of a feed wheel train and a ribbon winding mechanism.

The feed wheel train 20 of the tape printing apparatus A is described with reference to FIG. 12. The feed wheel train 20 includes a platen-side wheel train 21, an unwinding-side wheel train 22, and a winding-side wheel train 23.

The platen-side wheel train 21 transmits power from the feed motor 3 to a platen rotor 31 that is rotatably supported by the platen shaft 7. The platen rotor 31 engages with the platen rollers 102 and 202, and the platen rotor 31 rotates. In this manner, the platen rollers 102 and 202 rotate.

The unwinding-side wheel train 22 transmits power from the feed motor 3 to an unwinding rotor 32 that is rotatably supported by the unwinding shaft 8. The unwinding rotor 32 engages with the ribbon unwinding cores 103 and 203, and the unwinding rotor 32 rotates. In this manner, the ribbon unwinding cores 103 and 203 rotate.

The winding-side wheel train 23 transmits power from the feed motor 3 to a winding rotor 33 that is rotatably supported by the winding shaft 9. The winding rotor 33 engages with the first ribbon winding core 104 or the second ribbon winding core 204, and the winding rotor 33 rotates. In this manner, the first ribbon winding core 104 or the second ribbon winding core 204 rotates. A torque clutch 45, which will be described below, is provided to the winding-side wheel train 23. In addition, the winding rotor 33 configures the ribbon winding mechanism 28 which will be described below.

In addition, the feed wheel train 20 includes an unwinding clutch 26 and a winding clutch. The unwinding clutch 26 performs state switching to a state in which the power is transmitted from the feed motor 3 to the unwinding rotor 32 when the feed motor 3 rotates in the reverse direction, and the unwinding clutch 26 performs state switching to a state in which transmission of the power is blocked when the feed motor 3 rotates in the forward direction. In FIG. 12, the unwinding clutch 26 shown in a state in which the power is transmitted from the feed motor 3 to the unwinding rotor 32 is illustrated in a solid line, and the unwinding clutch 26 shown in a state in which the transmission of the power is blocked is illustrated in a two-dot chain line. The winding clutch (not illustrated) is provided on the −Z side of the feed motor 3 and performs state switching to a state in which the power is transmitted from the feed motor 3 to the winding rotor 33 when the feed motor 3 rotates in the forward direction, and the winding clutch performs state switching to a state in which transmission of the power is blocked when the feed motor 3 rotates in the reverse direction.

Figure 13:
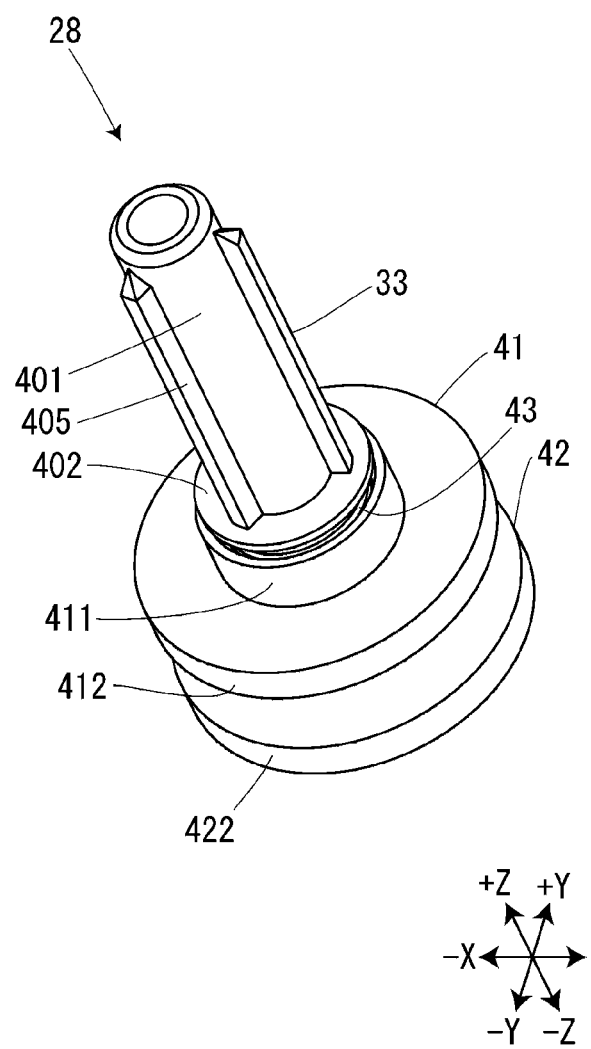
FIG. 13 is a perspective view of the ribbon winding mechanism.
Figure 14:
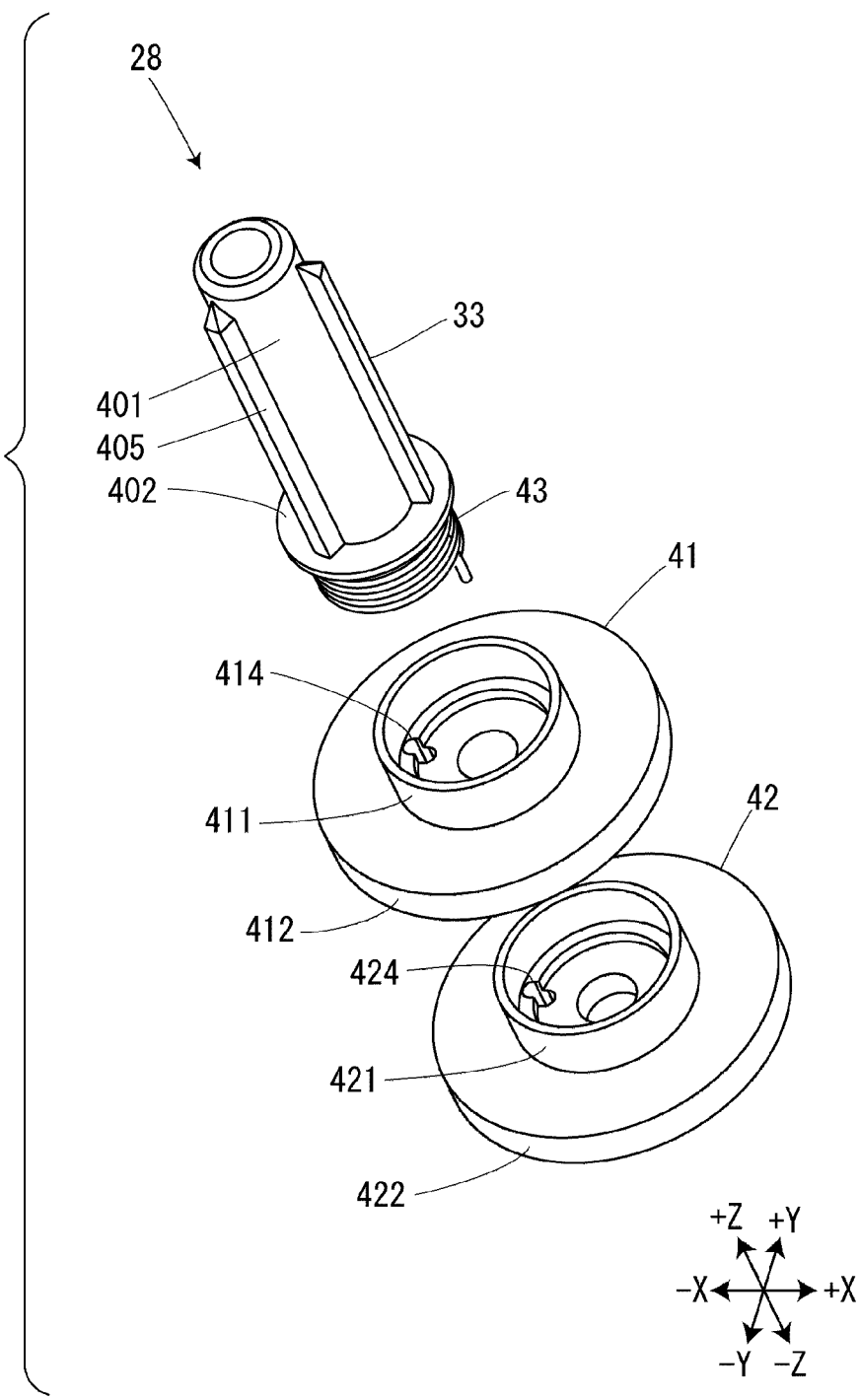
FIG. 14 is an exploded perspective view of the ribbon winding mechanism.
Figure 15:
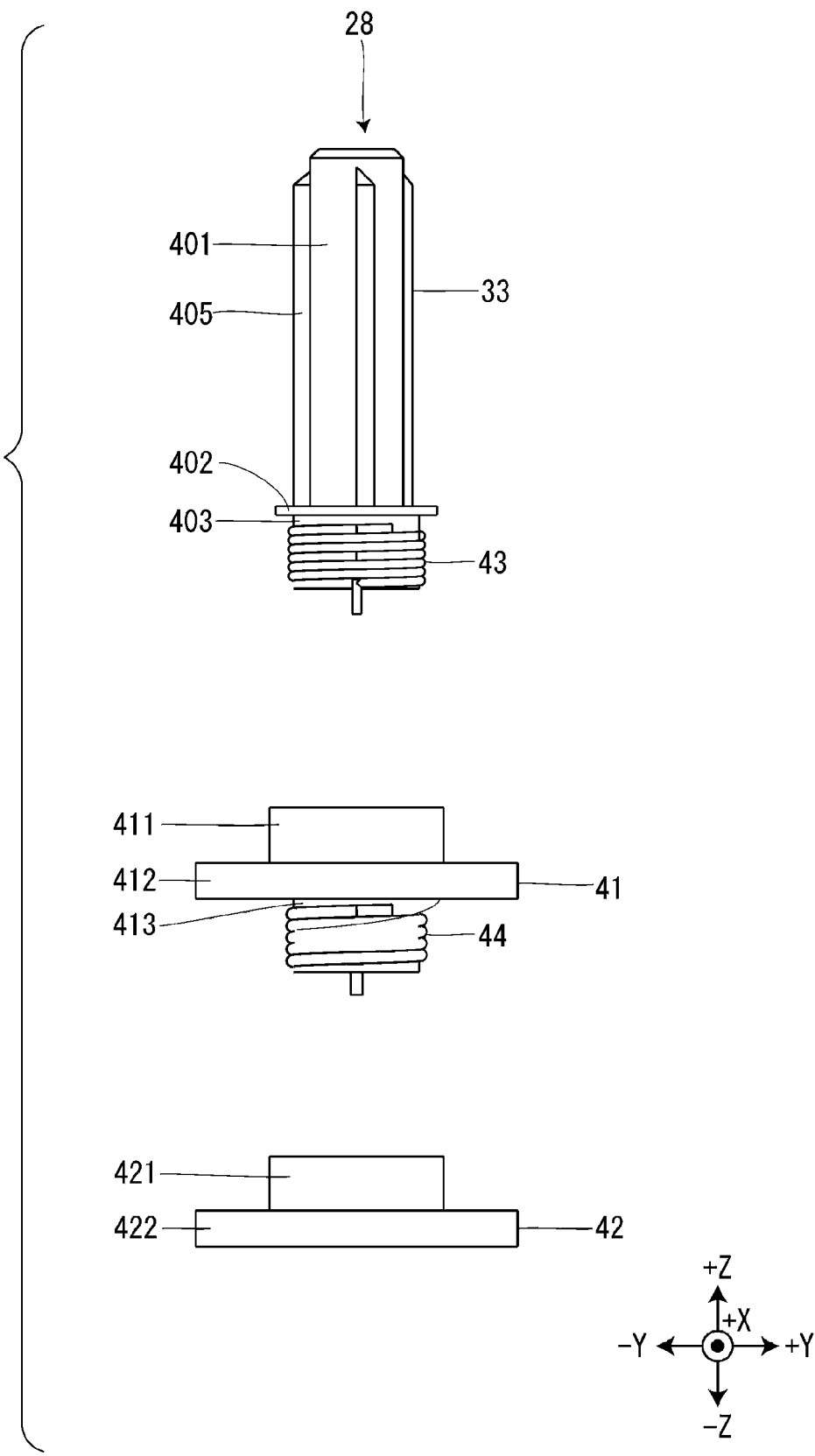
FIG. 15 is an exploded view of the ribbon winding mechanism viewed from the +X side.

The ribbon winding mechanism 28 of the tape printing apparatus A is described with reference to FIGS. 13 to 15. The ribbon winding mechanism 28 includes the winding rotor 33, a first winding gear 41, a second winding gear 42, a first slip spring 43, and a second slip spring 44. The ribbon winding mechanism 28, which are not illustrated in FIGS. 13 to 15, includes the torque clutch 45 (refer to FIG. 12 or the like) which will be described below.

As described above, the winding rotor 33 is rotatably supported by the winding shaft 9. The winding rotor 33 is provided with a core insertion portion 401, a flange 402, and a first spring coiling portion 403, in this order from the +Z side. The core insertion portion 401 is inserted into the first ribbon winding core 104 or the second ribbon winding core 204. The core insertion portion 401 is formed to have a cylindrical shape, and the outer circumferential surface thereof is provided with a plurality of (for example, three) rotor-side projecting portions 405 extending in an axial direction (Z direction) which are scattered in a circumferential direction at substantially equal intervals. The rotor-side projecting portions 405 engage with core-side projecting portions (not illustrated) provided on an inner circumferential surface of the first ribbon winding core 104 or the second ribbon winding core 204. The first slip spring 43 is coiled around the first spring coiling portion 403.

The first winding gear 41 is rotatably supported by the winding shaft 9. In other words, the first winding gear 41 is positioned on the −Z side from the winding rotor 33 and is provided to be coaxial to the winding rotor 33. The first winding gear 41 is connected to the winding rotor 33 via the first slip spring 43 and rotates the winding rotor 33.

The first winding gear 41 is provided with a first cylindrical portion 411, a first gear portion 412, and a second spring coiling portion 413, in this order from the +Z side. The first spring coiling portion 403, around which the first slip spring 43 is coiled, is inserted into the first cylindrical portion 411. A bottom surface of the first cylindrical portion 411 (in other words, a surface of the first gear portion 412 on the +Z side) is provided with a first spring engagement portion 414. An end portion of the first slip spring 43 on the −Z side engages with the first spring engagement portion 414. The outer circumferential surface of the first gear portion 412 is provided with a plurality of teeth that intermesh with a first planetary gear 51 which will be described below. The second slip spring 44 is coiled around the second spring coiling portion 413.

The second winding gear 42 is rotatably supported by the winding shaft 9. In other words, the second winding gear 42 is positioned on the −Z side from the first winding gear 41 and is provided to be coaxial to the winding rotor 33. The second winding gear 42 is connected to the first winding gear 41 via the second slip spring 44 and rotates the winding rotor 33 via the first winding gear 41.

The second winding gear 42 is provided with a second cylindrical portion 421 and a second gear portion 422 in this order from the +Z side. The second spring coiling portion 413, around which the second slip spring 44 is coiled, is inserted into the second cylindrical portion 421. A bottom surface of the second cylindrical portion 421 (in other words, a surface of the second gear portion 422 on the +Z side) is provided with a second spring engagement portion 424. An end portion of the second slip spring 44 on the −Z side engages with the second spring engagement portion 424. The outer circumferential surface of the second gear portion 422 is provided with a plurality of teeth that intermesh with a second planetary gear 52 which will be described below.

The first slip spring 43 is coiled around the first spring coiling portion 403 of the winding rotor 33 and the end portion of the first slip spring on the −Z side engages with the first spring engagement portion 414 of the first winding gear 41. In this manner, the winding rotor 33 and the first winding gear 41 are connected to each other. When a difference between a rotation speed of the winding rotor 33 and a rotation speed of the first winding gear 41 occurs and torque exceeding first torque is applied, the first slip spring 43 is loosened from a coiled state around the first spring coiling portion 403 and slips with respect to the first spring coiling portion 403. Therefore, the first slip spring 43 transmits torque from the first winding gear 41 to the winding rotor 33 in a case where the torque that does not exceed the first torque is applied; however, the transmission of torque from the first winding gear 41 to the winding rotor 33 is blocked in a case where the torque exceeding the first torque is applied. In other words, the first slip spring 43 limits torque, which is transmitted from the first winding gear 41 to the winding rotor 33, to the first torque.

The second slip spring 44 is coiled around the second spring coiling portion 413 of the first winding gear 41 and the end portion of the second slip spring on the −Z side engages with the second spring engagement portion 424 of the second winding gear 42. In this manner, the first winding gear 41 and the second winding gear 42 are connected to each other. When a difference between a rotation speed of the first winding gear 41 and a rotation speed of the second winding gear 42 occurs and torque exceeding second torque smaller than the first torque is applied, the second slip spring 44 is loosened from a coiled state around the second spring coiling portion 413 and slips with respect to the second spring coiling portion 413. In other words, the second slip spring 44 slips by torque smaller than that by which the first slip spring 43 slips. Therefore, the second slip spring 44 transmits torque from the second winding gear 42 to the first winding gear 41 in a case where the torque that does not exceed the second torque is applied; however, the transmission of torque from the second winding gear 42 to the first winding gear 41 is blocked in a case where the torque exceeding the second torque is applied. In other words, the second slip spring 44 limits torque, which is transmitted from the second winding gear 42 to the first winding gear 41, to the second torque.

In a case where the torque that does not exceed the second torque is applied to the second slip spring 44, the torque that is transmitted from the second winding gear 42 to the first winding gear 41 does not exceed the first torque, and thus is further transmitted from the first winding gear 41 to the winding rotor 33. Since the first winding gear 41 is provided between the winding rotor 33 and the second winding gear 42, it is possible to transmit the torque from the second winding gear 42 to the winding rotor 33 via the first winding gear 41 in a simple configuration.

Figure 16:
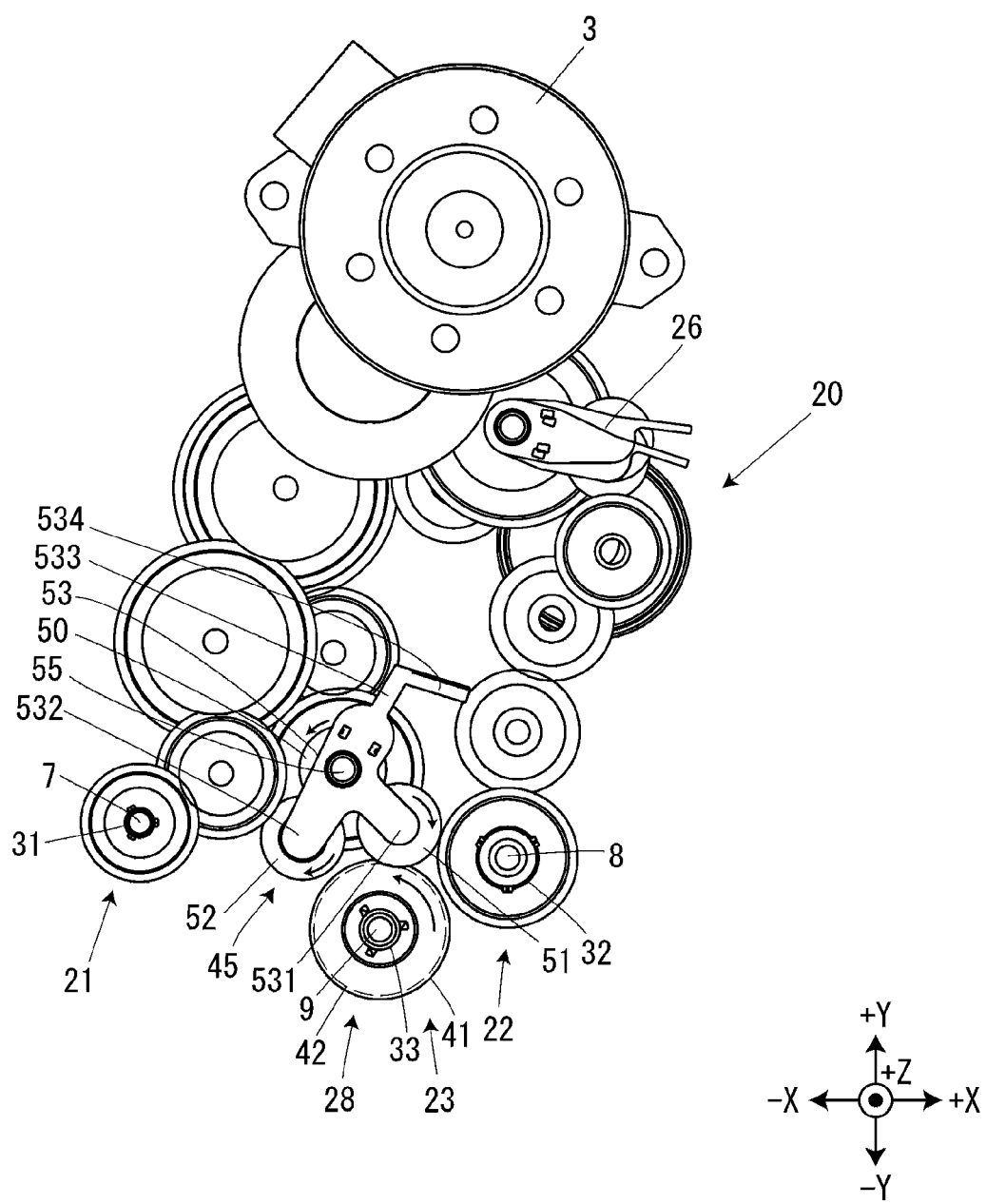
FIG. 16 is a view of the ribbon winding mechanism viewed from the +Z side in a case where a carrier is positioned at a first carrier position.
Figure 17:
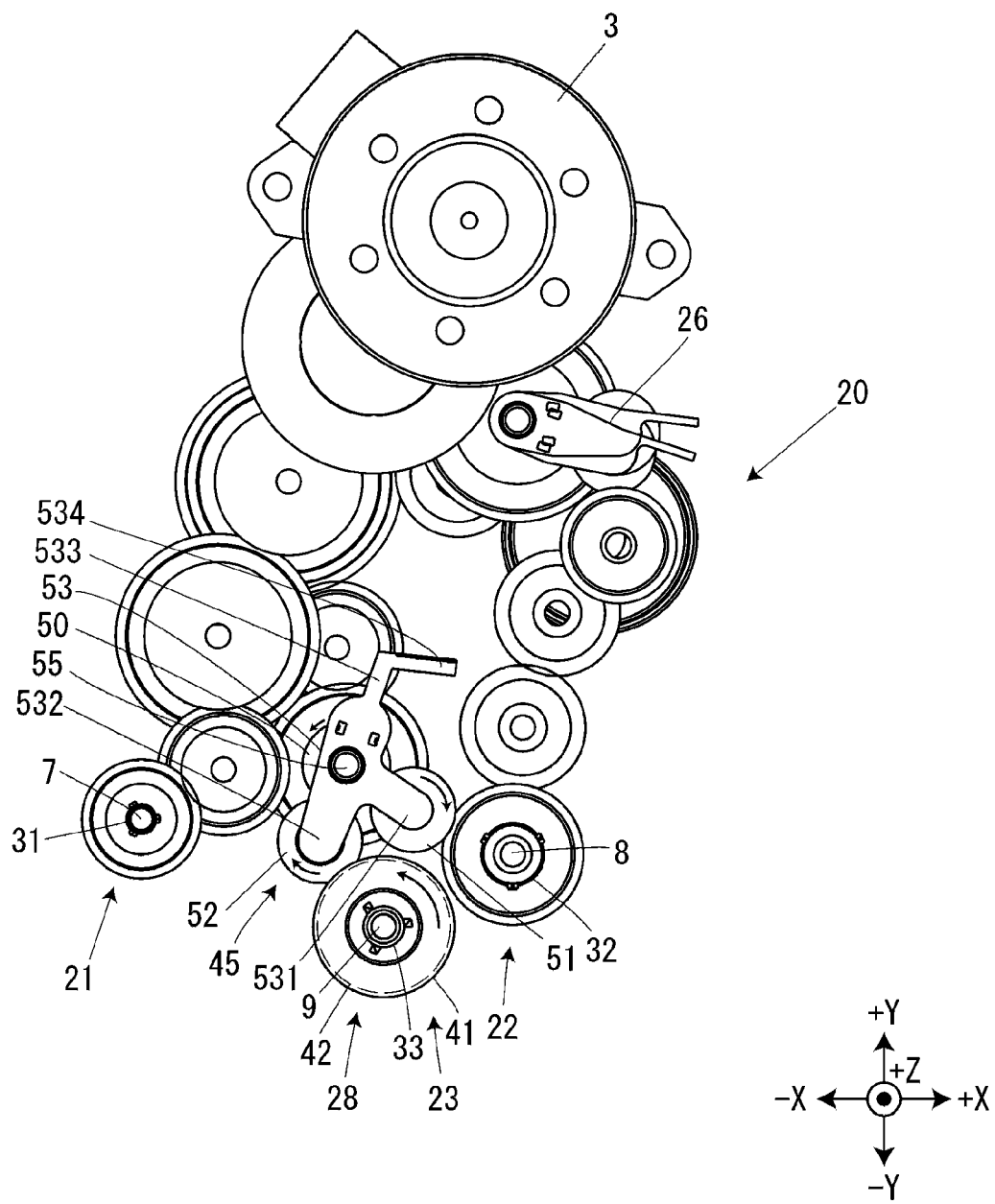
FIG. 17 is a view of the ribbon winding mechanism viewed from the +Z side in a case where the carrier is positioned at a second carrier position.

The torque clutch 45 is described with reference to FIGS. 12, 16, and 17. The torque clutch 45 inputs the power from the feed motor 3 to the first winding gear 41 in the case where the first cartridge 100 is mounted, and the torque clutch 45 inputs the power from the feed motor 3 to the second winding gear 42 in the case where the second cartridge 200 is mounted. In FIG. 12, the torque clutch 45 shown in a state in which the power is transmitted from the feed motor 3 to the first winding gear 41 is illustrated in a solid line, and the torque clutch 45 shown in a state in which the power is transmitted to the second winding gear 42 is illustrated in a two-dot chain line. The torque clutch 45 includes a sun gear 50, the first planetary gear 51, the second planetary gear 52, a carrier 53, the engagement member 54, and a clutch supporting shaft 55.

The clutch supporting shaft 55 is provided on the +Y side with respect to the winding shaft 9. As will be described below, the sun gear 50 and the carrier 53 are rotatably supported by the clutch supporting shaft 55.

The sun gear 50 is rotatably supported by the clutch supporting shaft 55. The power from the feed motor 3 is input to the sun gear 50 via the winding-side wheel train 23. When the power is input from the feed motor 3, the sun gear 50 rotates in a counterclockwise direction in FIG. 16 (hereinafter, similarly, a "clockwise direction" or a "counterclockwise direction" means a direction in FIG. 16 or 18). The first planetary gear 51 is separated from and approaches the first winding gear 41 from the substantially +Y side in an intermeshed state with the sun gear 50. The first planetary gear 51 rotates in the clockwise direction when the sun gear 50 rotates in the counterclockwise direction. The second planetary gear 52 is separated from and approaches the second winding gear 42 from the +Y side inclined to the −X side in an intermeshed state with the sun gear 50. The second planetary gear 52 rotates in the clockwise direction when the sun gear 50 rotates in the counterclockwise direction.

The carrier 53 is rotatably supported by the clutch supporting shaft 55. In other words, the carrier 53 is rotatably supported to be coaxial to the sun gear 50. The carrier 53 is provided with a first carrier supporting portion 531, a second carrier supporting portion 532, a protruding carrier portion 533, and a carrier engagement portion 534. The first carrier supporting portion 531 extends from the clutch supporting shaft 55 in a direction between the +X side and the −Y side. The first planetary gear 51 is rotatably supported by the first carrier supporting portion 531. The second carrier supporting portion 532 extends from the clutch supporting shaft 55 in a direction between the −X side and the −Y side. The second planetary gear 52 is rotatably supported by the second carrier supporting portion 532. The protruding carrier portion 533 protrudes on a side opposite to the second carrier supporting portion 532 with respect to the clutch supporting shaft 55, that is, in a direction between the +X side and the +Y side. The carrier engagement portion 534 is bent and extends from the front end of the protruding carrier portion 533 to the +X side. The carrier engagement portion 534 is positioned on the −Z side with respect to the engagement member 54 (refer to FIG. 3).

The carrier 53 is movable between a first carrier position (refer to FIG. 16), at which the first planetary gear 51 intermeshes with the first winding gear 41 and the second planetary gear 52 is separated from the second winding gear 42, and a second carrier position (refer to FIG. 17), at which the first planetary gear 51 is separated from the first winding gear 41 and the second planetary gear 52 intermeshes with the second winding gear 42. In other words, in a case where the carrier 53 is positioned at the first carrier position, the power is transmitted from the first planetary gear 51 to the first winding gear 41, but the power is not transmitted from the second planetary gear 52 to the second winding gear 42 when the sun gear 50 rotates. On the other hand, in a case where the carrier 53 is positioned at the second carrier position, the power is not transmitted from the first planetary gear 51 to the first winding gear 41, but the power is transmitted from the second planetary gear 52 to the second winding gear 42 when the sun gear 50 rotates. When the power is transmitted from the first planetary gear 51 to the first winding gear 41, the first winding gear 41 rotates in the counterclockwise direction. Similarly, when the power is transmitted from the second planetary gear 52 to the second winding gear 42, the second winding gear 42 rotates in the counterclockwise direction.

The carrier 53 is positioned at the first carrier position in an engaged stated with the engagement member 54. On the other hand, in a state in which the carrier 53 does not engage with the engagement member 54, and when the sun gear 50 rotates, the carrier 53 rotates in the counterclockwise direction along with the sun gear 50 and is positioned at the second carrier position.

The engagement member 54 is described with reference to FIGS. 3, 6, 9, and 12. The engagement member 54 projects from the mounting bottom wall 6 of the cartridge mounting unit 1 and is provided to be movable in the Z direction (in other words, to be retractable into the mounting bottom wall 6). The engagement member 54 is provided with an engagement cylindrical portion 541 and an engagement projecting portion 542.

An engagement spring 543 is accommodated in the engagement cylindrical portion 541. The engagement spring 543 applies a force to the engagement member 54 on the +Z side. For example, a compression coil spring may be used as the engagement spring 543. The engagement projecting portion 542 projects from the outer circumferential surface of the engagement cylindrical portion 541 on the −Y side. When the engagement member 54 moves in the Z direction, the engagement projecting portion 542 is separated from and approaches the +Z side of the carrier engagement portion 534. An engagement surface 544 that is a surface of the engagement projecting portion 542 on the −Z side is formed to have an inclined shape such that the front end portion of the engagement projecting portion 542 in a projecting direction (−Y side) is oriented to the +Z side.

The engagement member 54 has a non-mounting-period projecting length L that is a projecting length from the mounting bottom wall 6 in a case where neither the first cartridge 100 nor the second cartridge 200 are mounted in the cartridge mounting unit 1, and the non-mounting-period projecting length is larger than the first gap D1 and is larger than the second gap D2. Therefore, when the first cartridge 100 or the second cartridge 200 is mounted in the cartridge mounting unit 1, the engagement member 54 is pushed by the first cartridge 100 or the second cartridge 200 and moves (in other words, goes down) to the −Z side against the engagement spring 543. The engagement member 54 moves to the −Z side and, then, is locked by a locking mechanism (not illustrated) so as not to return to the +Z side by the engagement spring 543.

States of portions of the ribbon winding mechanism 28 in a case where neither the first cartridge 100 nor the second cartridge 200 are mounted in the cartridge mounting unit 1 are described with reference to FIG. 3. In this case, the engagement member 54 is disposed at a non-mounting position at which the projecting length from the mounting bottom wall 6 is the non-mounting-period projecting length L. At this time, the engagement projecting portion 542 is separated from the carrier engagement portion 534 on the +Z side and does not engage with the carrier engagement portion 534.

States of the portions of the ribbon winding mechanism 28 in a case where the first cartridge 100 is mounted in the cartridge mounting unit 1 are described with reference to FIGS. 6 and 16. In this case, as described above, since the non-mounting-period projecting length L of the engagement member 54 is larger than the first gap D1, the engagement member 54 is pushed by the first cartridge 100 to the −Z side until the projecting length from the mounting bottom wall 6 is equal to the first gap D1, and the engagement member 54 is positioned at an engaging position at which the engagement projecting portion 542 engages with the carrier engagement portion 534.

At this time, since the engagement projecting portion 542 projects on the −Y side, the carrier engagement portion 534 is pushed by the engagement projecting portion 542 on the −Y side, and the engagement member 54 rotates the carrier 53 in the counterclockwise direction, that is, to the first carrier position.

When the carrier 53 is positioned at the first carrier position, the first planetary gear 51 intermeshes with the first winding gear 41. In this state, even when the sun gear 50 rotates, the rotation of the carrier 53 to the second carrier position along with the sun gear 50 is blocked by the engagement member 54. In this manner, the state in which the first planetary gear 51 intermeshes with the first winding gear 41 is maintained. As a result, the torque clutch 45 inputs the power from the feed motor 3 to the first winding gear 41.

When the power from the feed motor 3 is input to the first winding gear 41 such that the first winding gear 41 rotates, the winding rotor 33 connected to the first winding gear 41 via the first slip spring 43 rotates. At this time, the second winding gear 42 also rotates by being driven by the first winding gear 41. The torque, which is transmitted from the first winding gear 41 to the winding rotor 33, is limited to the first torque by the first slip spring 43.

As described above, in the case where the first cartridge 100 is mounted, the engagement member 54 is pushed by the first cartridge 100 and moves to the −Z side, and thereby the engagement member 54 is positioned at the engaging position at which the engagement member engages with the carrier 53. In this manner, the carrier 53 is positioned at the first carrier position. The first planetary gear 51 intermeshes with the first winding gear 41, and the power from the feed motor 3 is input to the first winding gear 41. As a result, the torque, which is transmitted from the first winding gear 41 to the winding rotor 33, is limited to the first torque by the first slip spring 43, and the winding torque is switched to the first torque.

States of the portions of the ribbon winding mechanism 28 in a case where the second cartridge 200 is mounted in the cartridge mounting unit 1 are described with reference to FIGS. 9 and 17. In this case, as described above, since the non-mounting-period projecting length L of the engagement member 54 is larger than the second gap D2, the engagement member 54 is pushed by the second cartridge 200 to the −Z side until the projecting length from the mounting bottom wall 6 is equal to the second gap D2, and the engagement member 54 is positioned at a disengaging position at which the engagement projecting portion 542 does not engage with the carrier engagement portion 534.

In this state, when the sun gear 50 rotates, the carrier 53 rotates to the second carrier position along with the sun gear 50. In this manner, the second planetary gear 52 intermeshes with the second winding gear 42. As a result, the torque clutch 45 inputs the power from the feed motor 3 to the second winding gear 42.

When the power from the feed motor 3 is input to the second winding gear 42 such that the second winding gear 42 rotates, the first winding gear 41 connected to the second winding gear 42 via the second slip spring 44 rotates, and the winding rotor 33 connected to the first winding gear 41 via the first slip spring 43 rotates. The torque, which is transmitted from the second winding gear 42 to the winding rotor 33 via the first winding gear 41, is limited to the second torque by the second slip spring 44.

As described above, in the case where the second cartridge 200 is mounted, the movement length of the engagement member 54 is small, and thereby the engagement member 54 is positioned at the disengaging position at which the engagement member does not engage with the carrier 53. Therefore, when the sun gear 50 rotates, the carrier 53 rotates in the counterclockwise direction and is positioned at the second carrier position. The second planetary gear 52 intermeshes with the second winding gear 42, and the power from the feed motor 3 is input to the second winding gear 42. As a result, the torque, which is transmitted from the second winding gear 42 to the winding rotor 33 via the first winding gear 41, is limited to the second torque by the second slip spring 44, and the winding torque is switched to the second torque.

As described above, the ribbon winding mechanism 28 of the embodiment includes the winding rotor 33, the first winding gear 41, the second winding gear 42, the first slip spring 43, the second slip spring 44, and the torque clutch 45. The winding rotor 33 engages with the first ribbon winding core 104 or the second ribbon winding core 204. The first winding gear 41 is provided to be coaxial to the winding rotor 33 and rotates the winding rotor 33. The second winding gear 42 is provided to be coaxial to the winding rotor 33 and rotates the winding rotor 33 via the first winding gear 41. The first slip spring 43 limits the torque, which is transmitted from the first winding gear 41 to the winding rotor 33, to the first torque. The second slip spring 44 limits the torque, which is transmitted from the second winding gear 42 to the first winding gear 41, to the second torque lower than the first torque. The torque clutch 45 inputs the power from the feed motor 3 to the first winding gear 41 when the first cartridge 100 is mounted, and the torque clutch 45 inputs the power from the feed motor 3 to the second winding gear 42 when the second cartridge 200 is mounted.

In this configuration, when the first cartridge 100 is mounted, the power from the feed motor 3 is input to the first winding gear 41, and thus the torque that is transmitted to the winding rotor 33 is limited to the first torque by the first slip spring 43. On the other hand, when the second cartridge 200 is mounted, the power from the feed motor 3 is input to the second winding gear 42, and thus the torque that is transmitted to the winding rotor 33 via the first winding gear 41 is limited to the second torque by the second slip spring 44. Therefore, mounting of the first cartridge 100 in the cartridge mounting unit 1 by a user causes the winding torque of the winding rotor 33 to be switched to the first torque, and mounting of the second cartridge 200 in the cartridge mounting unit 1 causes the winding torque of the winding rotor 33 to be switched to the second torque. Hence, it is possible to switch the winding torque with a simple operation. In this manner, even in a case where one of the first cartridge 100 and the second cartridge 200 is mounted, the tape printing apparatus A can perform printing while the ink ribbon R is wound with the winding torque suitable for the mounted cartridge.

In addition, in the ribbon winding mechanism 28 of the embodiment, in a case where the first cartridge 100 that accommodates the first ink ribbon Ra having a relatively wide first ribbon width is mounted, the winding torque is switched to the first torque that is relatively high. In a case where the second cartridge 200 that accommodates the second ink ribbon Rb having a relatively narrow second ribbon width is mounted, the winding torque is switched to the second torque that is relatively low. In this manner, it is possible to suppress breaking of the ink ribbon R, and it is possible to appropriately wind the ink ribbon R.

In other words, as a comparative example of the embodiment, a configuration, in which the winding torque becomes the first torque even in a case where one of the first cartridge 100 and the second cartridge 200 is mounted, is assumed. In the comparative example, in a case where the second cartridge 200 is mounted, the second ink ribbon Rb having a relatively narrow width is wound with the first torque that is relatively high, and thus there is a concern that the second ink ribbon Rb will break (a portion of the ink ribbon R from the thermal head 11 to the second ribbon winding core 204, to which tension corresponding to the winding torque is applied, is heated by the thermal head 11, and thus the strength of the portion is degraded). By comparison, according to the embodiment, in the case where the second cartridge 200 is mounted, the second ink ribbon Rb having the relatively narrow width is wound with the second torque that is relatively low, and thus it is possible to suppress the breaking of the second ink ribbon Rb.

In addition, as another comparative example of the embodiment, a configuration, in which the winding torque becomes the second torque even in a case where one of the first cartridge 100 and the second cartridge 200 is mounted, is assumed. In the comparative example, in a case where the first cartridge 100 is mounted, the first ink ribbon Ra having a relatively wide width is wound with the second torque that is relatively low, and thus there is a concern that it is not possible to peel off the first ink ribbon Ra, which is pinched with the first tape Ta between the thermal head 11 and the platen roller 102, from the first tape Ta, and the first ink ribbon Ra, along with the first tape Ta, will be fed out of the first cartridge case 105. By comparison, according to the embodiment, in the case where the first cartridge 100 is mounted, the first ink ribbon Ra having the relatively wide width is wound with the first torque that is relatively high. Therefore, it is possible to peel off the first ink ribbon Ra from the first tape Ta, and it is possible to appropriately wind the first ink ribbon Ra.

A torque clutch 45A that is a modification example of the torque clutch 45 is described with reference to FIGS. 18 to 21. The torque clutch 45A has substantially the same configuration as that of the torque clutch 45. Hereinafter, a difference from the torque clutch 45 will be mainly described.

The torque clutch 45A inputs the power from the feed motor 3 to the first winding gear 41 and the second winding gear 42 in a case where the first cartridge 100 is mounted. In addition, the torque clutch 45A inputs the power from the feed motor 3 to the second winding gear 42 without inputting the power to the first winding gear 41 in a case where the second cartridge 200 is mounted. In other words, the torque clutch 45A inputs the power from the feed motor 3 to the first winding gear 41 in the case where the first cartridge 100 is mounted, and the torque clutch 45A does not input the power from the feed motor 3 in the case where the second cartridge 200 is mounted. On the other hand, the torque clutch 45A inputs the power from the feed motor 3 to the second winding gear 42 in both of the case where the first cartridge 100 is mounted and the case where the second cartridge 200 is mounted. In other words, the torque clutch 45A inputs the power from the feed motor 3 to the second winding gear 42 all the time when the feed motor 3 operates.

The torque clutch 45A includes the sun gear 50, a planetary gear 51a, the carrier 53, the engagement member 54, the clutch supporting shaft 55, a transmission gear 56, an input gear 57, and a clutch spring 58.

The clutch supporting shaft 55 is provided on the +Y side with respect to the winding shaft 9. The sun gear 50, the transmission gear 56 and the carrier 53 are rotatably supported by the clutch supporting shaft 55.

The sun gear 50 is rotatably supported by the clutch supporting shaft 55. The power from the feed motor 3 is input to the sun gear 50 via the winding-side wheel train 23. The sun gear 50 rotates in the counterclockwise direction when the power from the feed motor 3 is input to the sun gear 50. The planetary gear 51a is separated from and approaches the first winding gear 41 from the +Y side inclined to the −X side in an intermeshed state with the sun gear 50. The planetary gear 51a rotates in the clockwise direction when the sun gear 50 rotates in the counterclockwise direction.

The transmission gear 56 is provided on the −Z side of the sun gear 50 and integrally rotates along with the sun gear 50. The transmission gear 56 intermeshes with the input gear 57. The input gear 57 is provided between the transmission gear 56 and the second winding gear 42 and usually intermeshes with the transmission gear 56 and the second winding gear 42. Therefore, the input gear 57 inputs, to the second winding gear 42, the power transmitted from the feed motor 3 via the transmission gear 56. The input gear 57 rotates in the clockwise direction when the power from the feed motor 3 is input to the input gear, and the input gear rotates the second winding gear 42 in the counterclockwise direction.

The carrier 53 is rotatably supported by the clutch supporting shaft 55. In other words, the carrier 53 is rotatably supported to be coaxial to the sun gear 50. The carrier 53 is provided with a carrier supporting portion 530, an engagement-side carrier engagement portion 534a, and a spring-side carrier engagement portion 534b. The carrier supporting portion 530 extends from the clutch supporting shaft 55 in a direction between the −X side and the −Y side. The planetary gear 51a is rotatably supported by the carrier supporting portion 530. The engagement-side carrier engagement portion 534a extends from the clutch supporting shaft 55 in a direction between the +X side and the +Y side. The engagement-side carrier engagement portion 534a engages with the engagement member 54. The spring-side carrier engagement portion 534b is bent and extends from the clutch supporting shaft 55 in a direction between the −X side and the +Y side. The spring-side carrier engagement portion 534b engages with the clutch spring 58.

The carrier 53 is movable between the first carrier position (refer to FIG. 18), at which the planetary gear 51a intermeshes with the first winding gear 41, and the second carrier position (refer to FIG. 20), at which the planetary gear 51a is separated from the first winding gear 41. In other words, in a case where the carrier 53 is positioned at the first carrier position and when the sun gear 50 rotates, the power is transmitted from the planetary gear 51a to the first winding gear 41. On the other hand, in a case where the carrier 53 is positioned at the second carrier position and when the sun gear 50 rotates, the power is not transmitted from the planetary gear 51a to the first winding gear 41. When the power is transmitted from the planetary gear 51a to the first winding gear 41, the first winding gear 41 rotates in the counterclockwise direction.

The carrier 53 is positioned at the first carrier position in a state in which the engagement-side carrier engagement portion 534a engages with a first engagement portion 545 (which will be described below) of the engagement member 54. On the other hand, the carrier 53 is positioned at the second carrier position in a state in which the engagement-side carrier engagement portion 534a engages with a second engagement portion 546 (which will be described below) of the engagement member 54.

The clutch spring 58 engages with the spring-side carrier engagement portion 534b the engagement member 54, and a force is applied to the carrier 53 in the clockwise direction, that is, toward the second carrier position, with the engagement member 54 as a support. For example, a torsion coil spring may be used as the clutch spring 58.

The engagement member 54 engages with the engagement-side carrier engagement portion 534a. The engagement member 54 projects from the mounting bottom wall 6 of the cartridge mounting unit 1 and is provided to be movable in the Z direction. A force is applied to the engagement member 54 on the +Z side by the engagement spring 543 (not illustrated in FIG. 18 or the like). The engagement member 54 is formed to have a substantially quadrangular column shape, and a surface of the engagement member which is opposite to the engagement-side carrier engagement portion 534a is provided with the first engagement portion 545 and the second engagement portion 546 on the +Z side (refer to FIG. 21).

The second engagement portion 546 is provided to have a recessed shape in the surface that is opposite to the engagement-side carrier engagement portion 534a. In other words, the first engagement portion 545 protrudes more in a direction between the −X side and the +Y side than the second engagement portion 546. When the engagement member 54 moves in the Z direction, the engagement-side carrier engagement portion 534a slides between the first engagement portion 545 and the second engagement portion 546. The engagement surface 544 that is the surface of the first engagement portion 545 on the −Z side (in other words, the surface of the second engagement portion 546 on the +Z side) includes a front end portion of the first engagement portion 545 in the projecting direction (direction between the −X side and the +Y side), the front end portion having an inclined shape toward the +Z side.

The engagement member 54 has the non-mounting-period projecting length L that is a projecting length from the mounting bottom wall 6 in the case where neither of the first cartridge 100 nor the second cartridge 200 are mounted in the cartridge mounting unit 1, and the non-mounting-period projecting length is larger than the first gap D1 and is smaller than the second gap D2. Therefore, when the first cartridge 100 is mounted in the cartridge mounting unit 1, the engagement member 54 is pushed by the first cartridge 100 and moves to the −Z side against the engagement spring 543 (refer to FIG. 19). The engagement member 54 moves to the −Z side and, then, is locked by a locking mechanism (not illustrated) so as not to return to the +Z side by the engagement spring 543. On the other hand, even when the second cartridge 200 is mounted in the cartridge mounting unit 1, the engagement member 54 is not pushed by the second cartridge 200 and does not move to the −Z side (refer to FIG. 21).

Figure 20:
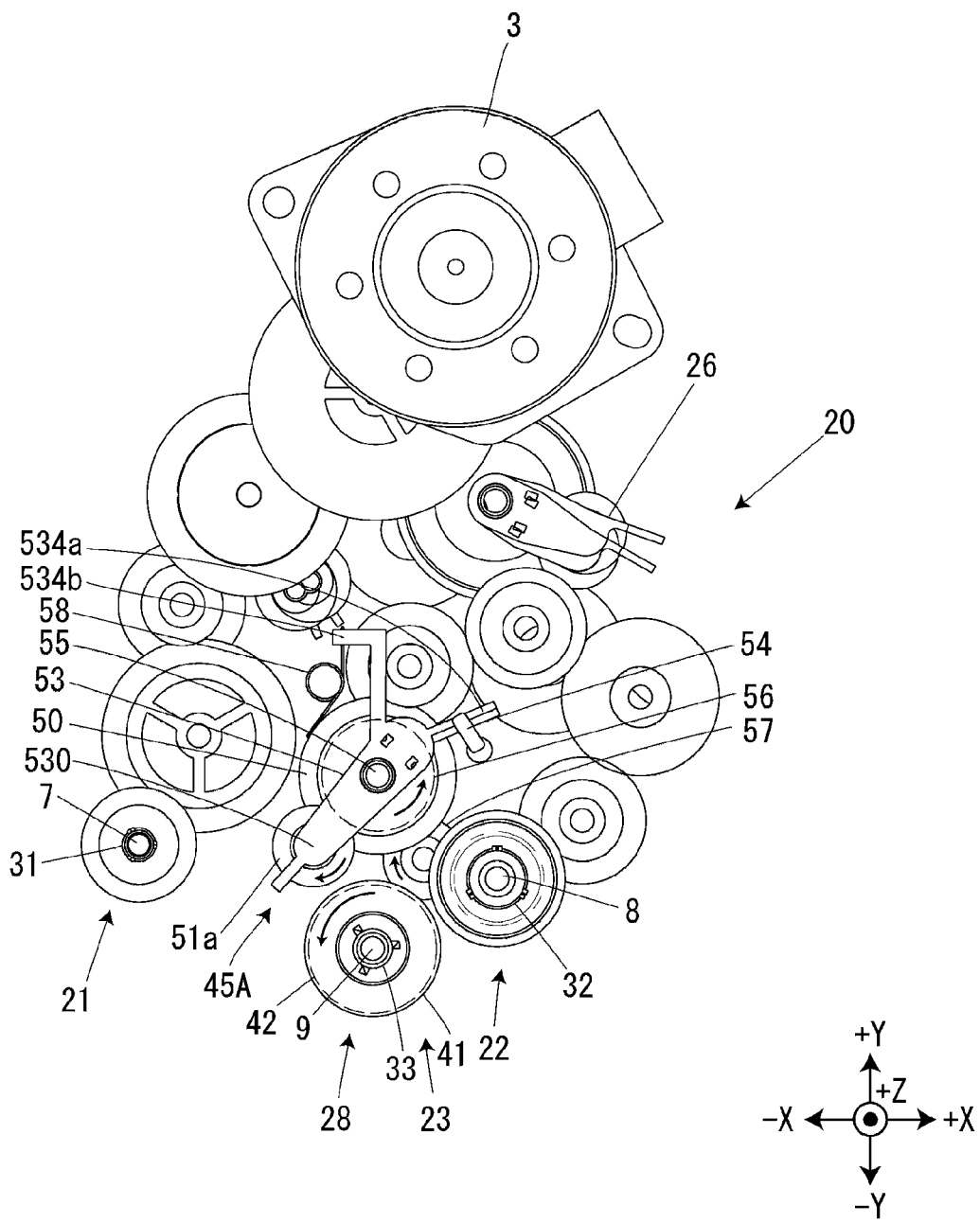
FIG. 20 is a view of the ribbon winding mechanism according to the modification example when viewed from the +Z side in a case where the carrier is positioned at a second carrier position.
Figure 21:
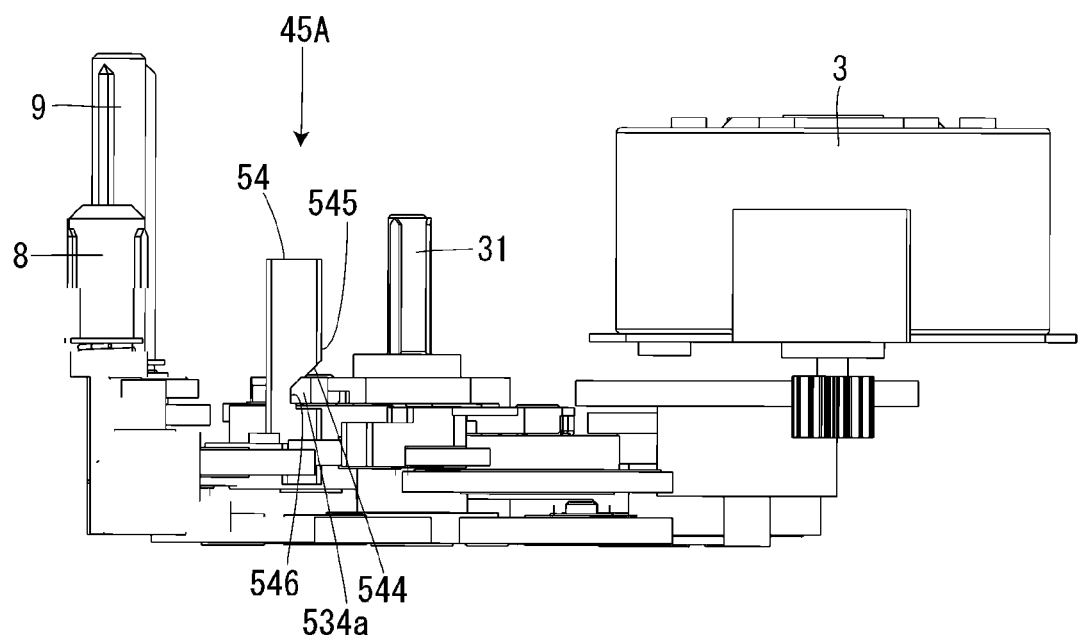
FIG. 21 is a view of the ribbon winding mechanism according to the modification example when viewed in a direction between the +X side and the +Y side in a case where the engagement member is positioned at a second engaging position.

States of the portions of the ribbon winding mechanism 28 in a case where neither the first cartridge 100 nor the second cartridge 200 are mounted in the cartridge mounting unit 1 are described with reference to FIGS. 20 and 21. In this case, the engagement member 54 is disposed at the non-mounting position at which the projecting length from the mounting bottom wall 6 is the non-mounting-period projecting length L. In other words, the engagement member 54 is positioned at the second engaging position at which the engagement member engages with the engagement-side carrier engagement portion 534a in the second engagement portion 546.

Figure 18:
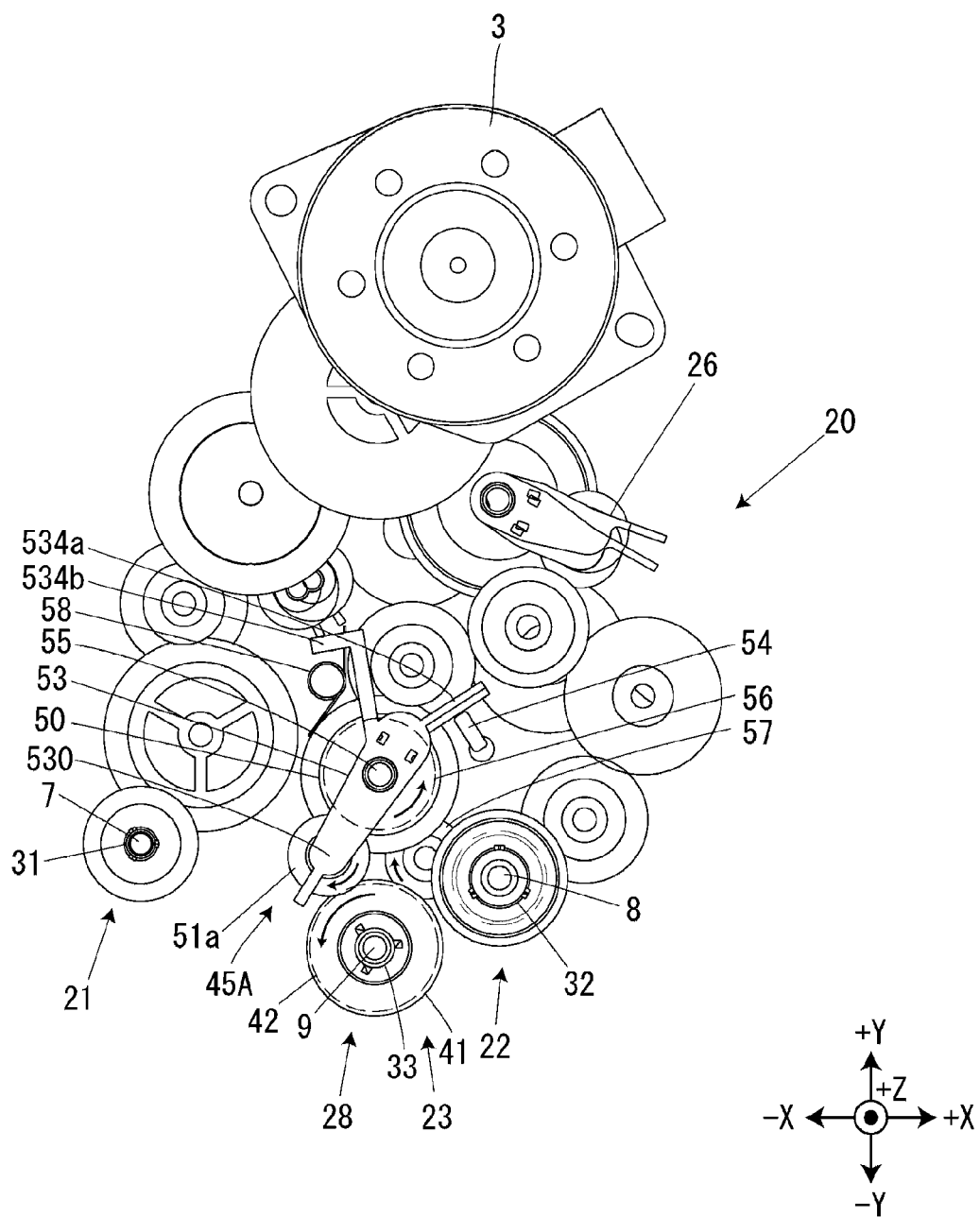
FIG. 18 is a view of a ribbon winding mechanism according to a modification example when viewed from the +Z side in a case where a carrier is positioned at a first carrier position.
Figure 19:
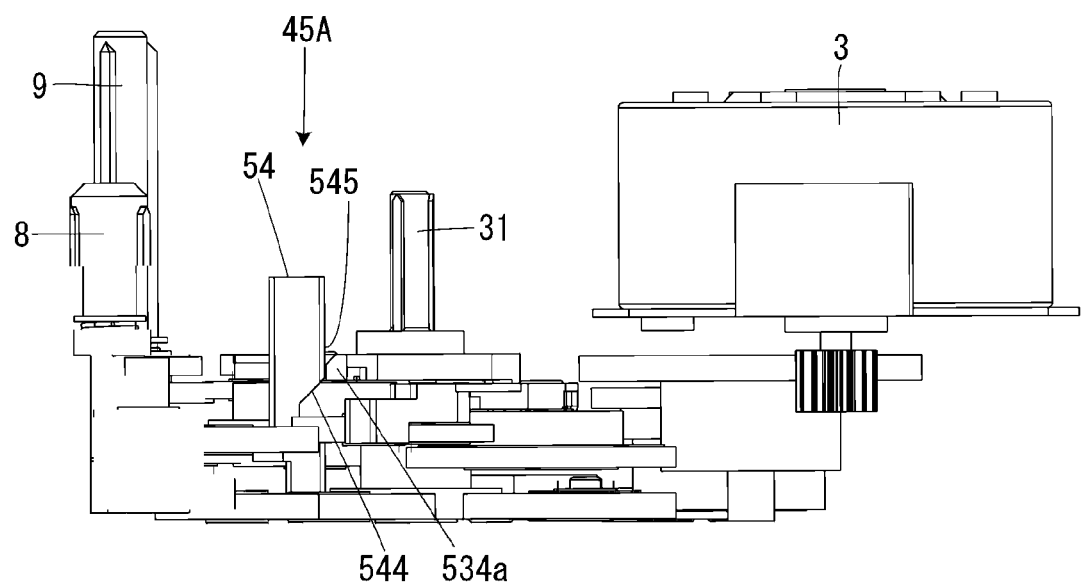
FIG. 19 is a view of the ribbon winding mechanism according to the modification example when viewed in a direction between the +X side and the +Y side in a case where an engagement member is positioned at a first engaging position.

States of the portions of the ribbon winding mechanism 28 in a case where the first cartridge 100 is mounted in the cartridge mounting unit 1 are described with reference to FIGS. 18 and 19. In this case, as described above, since the non-mounting-period projecting length L of the engagement member 54 is larger than the first gap D1, the engagement member 54 is pushed by the first cartridge 100 to the −Z side until the projecting length from the mounting bottom wall 6 is equal to the first gap D1, and the engagement member 54 is positioned at the first engaging position at which the engagement member engages with the engagement-side carrier engagement portion 534a in the first engagement portion 545.

At this time, since the first engagement portion 545 projects more in the direction between the −X side and the +Y side than the second engagement portion 546, the engagement-side carrier engagement 534a is pushed by the first engagement portion 545 in the direction between the −X side and the +Y side, and the engagement member 54 rotates the carrier 53 in the counterclockwise direction, that is, to the first carrier position.

In a state in which the carrier 53 is positioned at the first carrier position, the planetary gear 51a intermeshes with the first winding gear 41. In addition, as described above, the input gear 57 always intermeshes with the second winding gear 42. The torque clutch 45A inputs the power from the feed motor 3 to the first winding gear 41 and the second winding gear 42.

When the power from the feed motor 3 is input to the first winding gear 41 and the second winding gear 42 such that the first winding gear 41 and the second winding gear 42 rotate, the winding rotor 33 connected to the first winding gear 41 via the first slip spring 43 rotates. The torque, which is transmitted from the first winding gear 41 to the winding rotor 33, is limited to the first torque by the first slip spring 43. In other words, when both of the first winding gear 41 and the second winding gear 42 rotate, the torque on the side of the first winding gear 41 is adjusted as the winding torque.

As described above, in the case where the first cartridge 100 is mounted, the engagement member 54 is positioned at the first disengaging position. Therefore, the carrier 53 is positioned at the first carrier position. The first planetary gear 51 intermeshes with the first winding gear 41, and the power from the feed motor 3 is input to the first winding gear 41 and the second winding gear 42. As a result, the torque, which is transmitted from the first winding gear 41 to the winding rotor 33, is limited to the first torque by the first slip spring 43, and the winding torque is switched to the first torque.

States of the portions of the ribbon winding mechanism 28 in the case where the second cartridge 200 is mounted in the cartridge mounting unit 1 are described with reference to FIGS. 20 and 21. In this case, as described above, since the non-mounting-period projecting length L of the engagement member 54 is smaller than the second gap D2, the engagement member 54 is not pushed by the second cartridge 200 and does not move to the −Z side. Therefore, the engagement member 54 is positioned at the second engaging position at which the engagement member engages with the engagement-side carrier engagement portion 534a in the second engagement portion 546. At this time, the carrier 53 is positioned at the second carrier position.

In a state in which the carrier 53 is positioned at the second carrier position, the planetary gear 51a is separated from the first winding gear 41. On the other hand, as described above, the input gear 57 always intermeshes with the second winding gear 42. Therefore, the torque clutch 45 inputs the power from the feed motor 3 to the second winding gear 42.

When the power from the feed motor 3 is input to the second winding gear 42 such that the second winding gear 42 rotates, the first winding gear 41 connected to the second winding gear 42 via the second slip spring 44 rotates, and the winding rotor 33 connected to the first winding gear 41 via the first slip spring 43 rotates. The torque, which is transmitted from the second winding gear 42 to the winding rotor 33 via the first winding gear 41, is limited to the second torque by the second slip spring 44.

As described above, in the case where the second cartridge 200 is mounted, the movement length of the engagement member 54 is small (more specifically, does not move), and thereby the engagement member 54 is positioned at the second engaging position at which the engagement member 54 engages with the carrier 53 in the second engagement portion 546. In the case where the second cartridge 200 is mounted, the engagement member 54 is positioned at the second disengaging position. Therefore, the carrier 53 is positioned at the second carrier position. Since the planetary gear 51a is separated from the first winding gear 41, the power from the feed motor 3 is not input to the first winding gear 41, but is input to the second winding gear 42. As a result, the torque, which is transmitted from the second winding gear 42 to the winding rotor 33 via the first winding gear 41, is limited to the second torque by the second slip spring 44, and the winding torque is switched to the second torque.

As described above, the ribbon winding mechanism 28 including the torque clutch 45A according to a modification example includes the winding rotor 33, the first winding gear 41, the second winding gear 42, the first slip spring 43, the second slip spring 44, and the torque clutch 45A. The winding rotor 33 engages with the first ribbon winding core 104 or the second ribbon winding core 204. The first winding gear 41 is provided to be coaxial to the winding rotor 33 and rotates the winding rotor 33. The second winding gear 42 is provided to be coaxial to the winding rotor 33 and rotates the winding rotor 33 via the first winding gear 41. The first slip spring 43 limits the torque, which is transmitted from the first winding gear 41 to the winding rotor 33, to the first torque. The second slip spring 44 limits the torque, which is transmitted from the second winding gear 42 to the first winding gear 41, to the second torque lower than the first torque. The torque clutch 45A inputs the power from the feed motor 3 to the first winding gear 41 and the second winding gear 42 when the first cartridge 100 is mounted, and the torque clutch 45A inputs the power from the feed motor 3 to the second winding gear 42 without inputting the power to the first winding gear 41 when the second cartridge 200 is mounted.

In this configuration, when the first cartridge 100 is mounted, the power from the feed motor 3 is input to the first winding gear 41 and the second winding gear 42, and thus the torque that is transmitted to the winding rotor 33 is limited to the first torque by the first slip spring 43. On the other hand, when the second cartridge 200 is mounted, the power from the feed motor 3 is not input to the first winding gear 41 but is input to the second winding gear 42, and thus the torque that is transmitted to the winding rotor 33 via the first winding gear 41 is limited to the second torque by the second slip spring 44. Therefore, the mounting of the first cartridge 100 in the cartridge mounting unit 1 by a user causes the winding torque of the winding rotor 33 to be switched to the first torque, and the mounting of the second cartridge 200 in the cartridge mounting unit 1 causes the winding torque of the winding rotor 33 to be switched to the second torque. Hence, it is possible to switch the winding torque with a simple operation. In this manner, even in a case where one of the first cartridge 100 and the second cartridge 200 is mounted, the tape printing apparatus A can perform printing while the ink ribbon R is wound with the winding torque suitable for the mounted cartridge.

In addition, as described above, the planetary gear 51a is separated from and approaches the first winding gear 41 from the +Y side inclined to the −X side, and the planetary gear intermeshes with the first winding gear 41 from the substantially +Y side in a state in which the carrier 53 is positioned at the first carrier position after rotating in the clockwise direction. Therefore, in the case where the first winding gear 41 is locked, the force in the substantially +Y direction is applied to the planetary gear 51a. Therefore, if the planetary gear 51a is not restricted due to another gear or the like on the +Y side, there is a concern that the planetary gear 51a is hit with the force that is applied in the substantially +Y direction. In other words, the force is applied in a direction, in which the planetary gear 51a is blown to the outer side of the first winding gear 41. Therefore, there is a concern that a problem of intermeshing with the gears between the planetary gear 51a and the first winding gear 41 will arise. If the members such as the carrier 53 in the torque clutch 45A are all made of metal, it is possible to suppress the occurrence of hitting of the planetary gear 51a; however, the cost increases. By comparison, in the torque clutch 45A, the hitting of the planetary gear 51a is suppressed by the sun gear 50 in a state in which the carrier 53 is positioned at the first carrier position. Therefore, even when the members such as the carrier 53 are made of resin, it is possible to suppress the hitting of the planetary gear 51a in a case where the first winding gear 41 is locked and the force in the substantially +Y direction is applied to the planetary gear 51a.

The feed motor 3 is an example of a "drive source" of the invention. The first slip spring 43 is an example of a "first torque limiter" of the invention. The first torque limiter is not limited to the spring coiled around the winding rotor 33 like the first slip spring 43 and a felt type object may be used as the first torque limiter. The second slip spring 44 is an example of a "second torque limiter" of the invention. Similar to the first torque limiter, a felt type object may be used as the second torque limiter. The torque clutch 45 or the torque clutch 45A is an example of a "clutch" of the invention. The clutch spring 58 is an example of an "elastic member" of the invention.

It is needless to say that the invention is not limited to the embodiment described above and it is possible to employ various configurations within a range without departing from the effects of the invention. For example, it is also possible to modify the embodiment into the following examples, in addition to examples described above.

The torque clutch 45 is not limited to having the configuration, in which the carrier 53 is positioned at the first carrier position in a case where the engagement member 54 is positioned at the engaging position and engages with the carrier 53, and the carrier 53 is positioned at the second carrier position when the sun gear 50 rotates in a case where the engagement member is positioned at the disengaging position and does not engage with the carrier 53, and this may be reversely performed. In other words, a configuration, in which the carrier 53 is positioned at the second carrier position in a case where the engagement member 54 is positioned at the engaging position and engages with the carrier 53, and the carrier 53 is positioned at the first carrier position in a case where the engagement member 54 is positioned at the disengaging position and does not engage with the carrier 53 when the sun gear 50 rotates may be employed. In this case, the engagement member 54 is positioned at the disengaging position in the case where the first cartridge 100 is mounted, and the engagement member 54 is positioned at the engaging position in the case where the second cartridge 200 is mounted. In this configuration, in the case where the first cartridge 100 is mounted, the engagement member 54 is positioned at the disengaging position at which the engagement member does not engage with the carrier 53, and thereby the carrier 53 is positioned at the first carrier position when the sun gear 50 rotates. On the other hand, in a case where the second cartridge 200 is mounted, the engagement member 54 is positioned at the engaging position at which the engagement member engages with the carrier 53, and thereby the carrier 53 is positioned at the second carrier position.

Similarly, the torque clutch 45A is not limited to having the configuration, in which the carrier 53 is positioned at the first carrier position in a case where the engagement member 54 is positioned at the first engaging position and engages with the carrier 53 in the first engagement portion 545, and the carrier 53 is positioned at the second carrier position in a case where the engagement member is positioned at the second engaging position and engages with the carrier 53 in the second engagement portion 546, and this may be reversely performed. In other words, a configuration, in which the carrier 53 is positioned at the second carrier position in a case where the engagement member 54 is positioned at the first engaging position and engages with the carrier 53 in the first engagement portion 545, and the carrier 53 is positioned at the first carrier position 545 in a case where the engagement member 54 is positioned at the second engaging position and engages with the carrier 53 in the second engagement portion 546, may be employed. In this case, the engagement member 54 is positioned at the second engaging position in the case where the first cartridge 100 is mounted, and the engagement member 54 is positioned at the second engaging position in the case where the second cartridge 200 is mounted. In addition, the clutch spring 58 applies a force to the carrier 53 toward the first carrier position. In this configuration, in the case where the first cartridge 100 is mounted, the engagement member 54 is positioned at the second engaging position at which the engagement member engages with the carrier 53 in the second engagement portion 546, and thereby the carrier 53 is positioned at the first carrier position. On the other hand, in the case where the second cartridge 200 is mounted, the engagement member 54 is positioned at the first engaging position at which the engagement member engages with the carrier 53 in the first engagement portion 545, and thereby the carrier 53 is positioned at the second carrier position.

The torque clutch 45 is not limited to having the configuration in which the non-mounting-period projecting length L of the engagement member 54 is larger than the first gap D1 and is larger than the second gap D2, and a configuration in which, similar to the torque clutch 45A, the non-mounting-period projecting length is larger than the first gap D1 and is smaller than the second gap D2 may be employed. In this configuration, in the case where the second cartridge 200 is mounted, the engagement member 54 is not pushed by the second cartridge 200, and thus the engagement member 54 does not move to the side of the carrier 53. As described above, the small movement length of the engagement member 54 to the side of the carrier 53 also includes a case where the engagement member 54 does not move to the side of carrier 53, that is, a case where the movement amount is zero. Similarly, the torque clutch 45A is not limited to having the configuration in which the non-mounting-period projecting length L of the engagement member 54 is larger than the first gap D1 and is smaller than the second gap D2. Similar to the torque clutch 45, a configuration in which the non-mounting-period projecting length is larger than the first gap D1 and is larger than the second gap D2 may be employed.

The torque clutch 45 is not limited to having the configuration in which the first planetary gear 51 intermeshes with the first winding gear 41, and a configuration in which the first planetary gear adjoins the first winding gear 41 via one or a plurality of gears provided between the first planetary gear 51 and the first winding gear 41 may be employed. In addition, the second planetary gear 52 is not limited to having the configuration of intermeshing with the second winding gear 42, and a configuration in which the second planetary gear adjoins the second winding gear 42 via one or a plurality of gears provided between the second planetary gear 52 and the second winding gear 42 may be employed. Similarly, the torque clutch 45A is not limited to having the configuration in which the planetary gear 51a intermeshes with the first winding gear 41, and a configuration in which the planetary gear adjoins the first winding gear 41 via one or a plurality of gears provided between the planetary gear 51a and the first winding gear 41 may be employed.

The torque clutch 45 is not limited to having the configuration in which the engagement member 54 is pushed by the first cartridge 100 or the second cartridge 200, and thereby the engagement member 54 moves to the engaging position and the disengaging position. For example, the engagement member 54 may be configured to move to the engaging position and the disengaging position by the drive source such as the motor. In other words, the ribbon winding mechanism 28 may be configured to include a sensor that detects various types of cartridges mounted in the cartridge mounting unit 1 and a drive source that moves the engagement member 54 to the engaging position or the disengaging position based on the detection result of the sensor. Similarly, in the torque clutch 45A, the engagement member 54 may be configured to move to the first engaging position and the second engaging position by the drive source such as the motor.

The configuration of the ribbon winding mechanism 28 is not limited to the configuration in which the winding torque is switched in two levels of the first torque and the second torque, and a configuration in which winding torque is switched in three or more levels may be employed. For example, the ribbon winding mechanism 28 may switch the winding torque in three levels in the following configuration. The ribbon winding mechanism 28 further includes a third winding gear and a third slip spring. The third winding gear is provided to be coaxial to the winding rotor 33 and rotates the winding rotor 33 via the second winding gear 42 and the first winding gear 41. The third slip spring limits the torque, which is transmitted from the third winding gear to the second winding gear 42, to third torque lower than the second torque. The torque clutch 45 inputs the power from the feed motor 3 to the first winding gear 41 in the case where the first cartridge 100 is mounted, and the torque clutch 45 inputs the power from the feed motor 3 to the second winding gear 42 in the case where the second cartridge 200 is mounted. In the case where another cartridge (for example, a cartridge accommodating a third ink ribbon having a width narrower than that of the second ink ribbon Rb) is mounted, and the power from the feed motor 3 is input to the third winding gear.

A difference between the first ink ribbon Ra and the second ink ribbon Rb may not be limited to the width, and a difference therebetween may be a material. In addition, the first cartridge 100 and the second cartridge 200 may accommodate the tape T, and the cartridges may be a cartridge that accommodates the ink ribbon R.

This application claims priority under 35 U.S.C. § 119 to Japanese Patent Application No. 2017-079626, filed Apr. 13 2017, and No. 2017-250962, filed Dec. 27 2017. The entire disclosure of Japanese Patent Application No. 2017-079626 and No. 2017-250962 are hereby incorporated herein by reference.

What is claimed is:

1. A ribbon winding mechanism comprising:
   a winding rotor that is provided in a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted, and that engages with the first ribbon winding core and the second ribbon winding core;
   a first winding gear that is provided to be coaxial to the winding rotor and rotates the winding rotor;
   a second winding gear that is provided to be coaxial to the winding rotor and rotates the winding rotor via the first winding gear;
   a first torque limiter that limits torque transmitted from the first winding gear to the winding rotor to first torque;
   a second torque limiter that limits torque transmitted from the second winding gear to the first winding gear to second torque lower than the first torque; and
   a clutch that inputs power from a drive source to the first winding gear when the first cartridge is mounted and inputs the power from the drive source to the second winding gear when the second cartridge is mounted.

2. The ribbon winding mechanism according to claim 1, wherein the clutch includes
   a sun gear to which the power from the drive source is input,
   a first planetary gear that intermeshes with the sun gear and adjoins the first winding gear,
   a second planetary gear that intermeshes with the sun gear and adjoins the second winding gear, and
   a carrier that supports the first planetary gear and the second planetary gear in a rotatable manner and is provided to be rotatable between a first carrier position, at which the power is transmitted from the first planetary gear to the first winding gear but the power is not transmitted from the second planetary gear to the second winding gear when the sun gear rotates, and a second carrier position, at which the power is not transmitted from the first planetary gear to the first winding gear but the power is transmitted from the second planetary gear to the second winding gear when the sun gear rotates, and
   wherein the carrier is positioned at the first carrier position when the first cartridge is mounted, and the carrier is positioned at the second carrier position when the second cartridge is mounted.

3. The ribbon winding mechanism according to claim 2, wherein the clutch further includes an engagement member that is provided to be movable to an engaging position, at which the engagement member engages with the carrier such that the carrier is positioned at the first carrier position, and to a disengaging position, at which the engagement member does not engage with the carrier such that the carrier is positioned at the second carrier position when the sun gear rotates, and
   wherein the engagement member is positioned at the engaging position when the first cartridge is mounted, and the engagement member is positioned at the disengaging position when the second cartridge is mounted.

4. The ribbon winding mechanism according to claim 3, wherein the engagement member retractably projects from a wall portion of the cartridge mounting unit, and
   wherein the engagement member is pushed by the first cartridge to be positioned at the engaging position when the first cartridge is mounted, and the engagement member is positioned at the disengaging position when the second cartridge is mounted, with a smaller movement length compared to a case where the first cartridge is mounted.

5. The ribbon winding mechanism according to claim 4, wherein the first cartridge is mounted in the cartridge mounting unit such that a gap from the wall portion is a first gap, and the second cartridge is mounted in the cartridge mounting unit such that a gap from the wall portion is a second gap larger than the first gap, and
   wherein the engagement member has a non-mounting-period projecting length that is larger than the first gap, the mounting-period projecting length being a projecting length from the wall portion which is obtained when neither the first cartridge nor the second cartridge are mounted in the cartridge mounting unit.

6. The ribbon winding mechanism according to claim 2, wherein the clutch further includes an engagement member that is provided to be movable to an engaging position, at which the engagement member engages with the carrier such that the carrier is positioned at the second carrier position, and to a disengaging position, at which the engagement member does not engage with the carrier such that the carrier is positioned at the first carrier position when the sun gear rotates, and
   wherein the engagement member is positioned at the disengaging position when the first cartridge is mounted, and the engagement member is positioned at the engaging position when the second cartridge is mounted.

7. A ribbon winding mechanism comprising:
   a winding rotor that is provided in a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted, and that engages with the first ribbon winding core and the second ribbon winding core;
a first winding gear that is provided to be coaxial to the winding rotor and rotates the winding rotor;
a second winding gear that is provided to be coaxial to the winding rotor and rotates the winding rotor via the first winding gear;
a first torque limiter that limits torque transmitted from the first winding gear to the winding rotor to first torque;
a second torque limiter that limits torque transmitted from the second winding gear to the first winding gear to second torque lower than the first torque; and
a clutch that inputs power from a drive source to the first winding gear and the second winding gear when the first cartridge is mounted and inputs the power from the drive source to the second winding gear without inputting the power to the first winding gear when the second cartridge is mounted.

8. The ribbon winding mechanism according to claim 7, wherein the clutch includes
an input gear that inputs the power from the drive source to the second winding gear,
a sun gear to which the power from the drive source is input,
a planetary gear that intermeshes with the sun gear and adjoins the first winding gear, and
a carrier that supports the planetary gear in a rotatable manner and is provided to be rotatable between a first carrier position, at which the power is transmitted from the planetary gear to the first winding gear when the sun gear rotates, and a second carrier position, at which the power is not transmitted from the planetary gear to the first winding gear when the sun gear rotates, and
wherein the carrier is positioned at the first carrier position when the first cartridge is mounted, and the carrier is positioned at the second carrier position when the second cartridge is mounted.

9. The ribbon winding mechanism according to claim 8, wherein the clutch further includes
an elastic member that applies a force to the carrier toward the second carrier position, and
an engagement member that is provided to be movable to a first engaging position, at which the engagement member engages with the carrier in a first engagement portion and the carrier is positioned at the first carrier position against the elastic member, and to a second engaging position, at which the engagement member engages with the carrier in a second engagement portion and the carrier is positioned at the second carrier position by the elastic member, and
wherein the engagement member is positioned at the first engaging position when the first cartridge is mounted, and the engagement member is positioned at the second engaging position when the second cartridge is mounted.

10. The ribbon winding mechanism according to claim 8, wherein the clutch further includes
an elastic member that applies a force to the carrier toward the first carrier position, and
an engagement member that is provided to be movable to a first engaging position, at which the engagement member engages with the carrier in a first engagement portion and the carrier is positioned at the second carrier position against the elastic member, and to a second engaging position, at which the engagement member engages with the carrier in a second engagement portion and the carrier is positioned at the first carrier position by the elastic member, and
wherein the engagement member is positioned at the second engaging position when the first cartridge is mounted, and the engagement member is positioned at the first engaging position when the second cartridge is mounted.

11. The ribbon winding mechanism according to claim 1, wherein the first winding gear is provided between the winding rotor and the second winding gear.

12. The ribbon winding mechanism according to claim 1, wherein the second ink ribbon has a width narrower than the first ink ribbon.

13. A tape printing apparatus comprising:
a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted;
a ribbon winding mechanism that rotates the first ribbon winding core and the second ribbon winding core;
a drive source that drives the ribbon winding mechanism; and
a thermal head that performs printing by using the first ink ribbon when the first cartridge is mounted and that performs printing by using the second ink ribbon when the second cartridge is mounted,
wherein the ribbon winding mechanism includes
a winding rotor that is provided in the cartridge mounting unit and engages with the first ribbon winding core and the second ribbon winding core,
a first winding gear that is provided to be coaxial to the winding rotor and rotates the winding rotor,
a second winding gear that is provided to be coaxial to the winding rotor and rotates the winding rotor via the first winding gear,
a first torque limiter that limits torque transmitted from the first winding gear to the winding rotor to first torque,
a second torque limiter that limits torque transmitted from the second winding gear to the first winding gear to second torque lower than the first torque, and
a clutch that inputs power from the drive source to the first winding gear when the first cartridge is mounted and inputs the power from the drive source to the second winding gear when the second cartridge is mounted.

14. A tape printing apparatus comprising:
a cartridge mounting unit in which a first cartridge, which accommodates a first ribbon winding core around which a first ink ribbon is wound, and a second cartridge, which accommodates a second ribbon winding core around which a second ink ribbon different from the first ink ribbon is wound, are mounted;
a ribbon winding mechanism that rotates the first ribbon winding core and the second ribbon winding core;
a drive source that drives the ribbon winding mechanism; and
a thermal head that performs printing by using the first ink ribbon when the first cartridge is mounted and that performs printing by using the second ink ribbon when the second cartridge is mounted, wherein the ribbon winding mechanism includes
- a winding rotor that is provided in the cartridge mounting unit and engages with the first ribbon winding core and the second ribbon winding core,
- a first winding gear that is provided to be coaxial to the winding rotor and rotates the winding rotor,
- a second winding gear that is provided to be coaxial to the winding rotor and rotates the winding rotor via the first winding gear,
- a first torque limiter that limits torque transmitted from the first winding gear to the winding rotor to first torque,
- a second torque limiter that limits torque transmitted from the second winding gear to the first winding gear to second torque lower than the first torque, and
- a clutch that inputs power from the drive source to the first winding gear and the second winding gear when the first cartridge is mounted and does not input the power from the drive source to the second winding gear without inputting the power to the first winding gear when the second cartridge is mounted.

* * * * *